(12) United States Patent
Wilden et al.

(10) Patent No.: US 9,277,365 B1
(45) Date of Patent: Mar. 1, 2016

(54) NOTIFICATION RELATED TO PREDICTED FUTURE GEOGRAPHIC LOCATION OF MOBILE DEVICE

(71) Applicant: Google Inc., Mountain View, CA (US)

(72) Inventors: Leif Hendrik Wilden, Belmont, CA (US); Ioannis Tsoukalidis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 13/972,839

(22) Filed: Aug. 21, 2013

Related U.S. Application Data

(60) Provisional application No. 61/691,760, filed on Aug. 21, 2012, provisional application No. 61/691,763, filed on Aug. 21, 2012, provisional application No. 61/691,765, filed on Aug. 21, 2012.

(51) Int. Cl.
*H04W 64/00* (2009.01)
*H04W 4/02* (2009.01)

(52) U.S. Cl.
CPC .................................... *H04W 4/028* (2013.01)

(58) Field of Classification Search
CPC ....... H04W 4/025; H04W 4/028; H04W 4/04; H04W 4/027; H04W 4/12; H04W 68/005; H04W 4/046; H04W 52/0251; H04W 60/04; H04M 1/72572; G08B 25/006; G08B 21/0269; H04L 67/306
USPC .......... 455/456.3, 404.1, 404.2, 414.2, 414.3, 455/414.4; 701/412, 418, 419, 424, 425, 701/426, 428, 438, 478.5, 479, 480, 507, 701/505, 509, 512, 518
See application file for complete search history.

(56) References Cited

U.S. PATENT DOCUMENTS

| | | | |
|---|---|---|---|
| 8,296,066 B2 | 10/2012 | Zhao et al. | |
| 8,378,815 B1* | 2/2013 | McNulty | G06Q 10/0833 340/539.13 |
| 8,576,067 B2* | 11/2013 | Malkin | G01S 5/02 340/539.11 |
| 2008/0032666 A1* | 2/2008 | Hughes | H04W 4/02 455/404.1 |
| 2008/0032703 A1* | 2/2008 | Krumm | H04W 4/02 455/456.1 |
| 2010/0248746 A1* | 9/2010 | Saavedra | G01C 21/3407 455/456.3 |
| 2011/0032093 A1* | 2/2011 | Miller | B60W 30/146 340/441 |
| 2011/0083101 A1* | 4/2011 | Sharon | G06F 21/6245 715/800 |
| 2011/0161001 A1* | 6/2011 | Fink | G01C 21/3617 701/533 |
| 2012/0158289 A1* | 6/2012 | Bernheim Brush | G01C 21/3484 701/425 |
| 2012/0289217 A1* | 11/2012 | Riemer | H01M 1/72577 455/418 |
| 2013/0303183 A1* | 11/2013 | Mansour | H04W 24/00 455/456.1 |

* cited by examiner

*Primary Examiner* — Sharad Rampuria
*Assistant Examiner* — Obidon Bassinan
(74) *Attorney, Agent, or Firm* — Dority & Manning, P.A.

(57) ABSTRACT

Systems and methods for receiving a notification related to a predicted future geographic location of a mobile device are provided. In some aspects, a plurality of geographic locations of the mobile device are determined. A speed for the mobile device is determined based on at least a subset of the plurality of geographic locations and associated timestamps. A future geographic location of the mobile device is predicted based on the speed and at least one geographic location from among the plurality of geographic locations. A representation of the predicted future geographic location of the mobile device is provided to a server. In response to the provided representation of the predicted future geographic location of the mobile device, a notification related to a point of interest associated with the predicted future geographic location of the mobile device is received from the server.

20 Claims, 14 Drawing Sheets

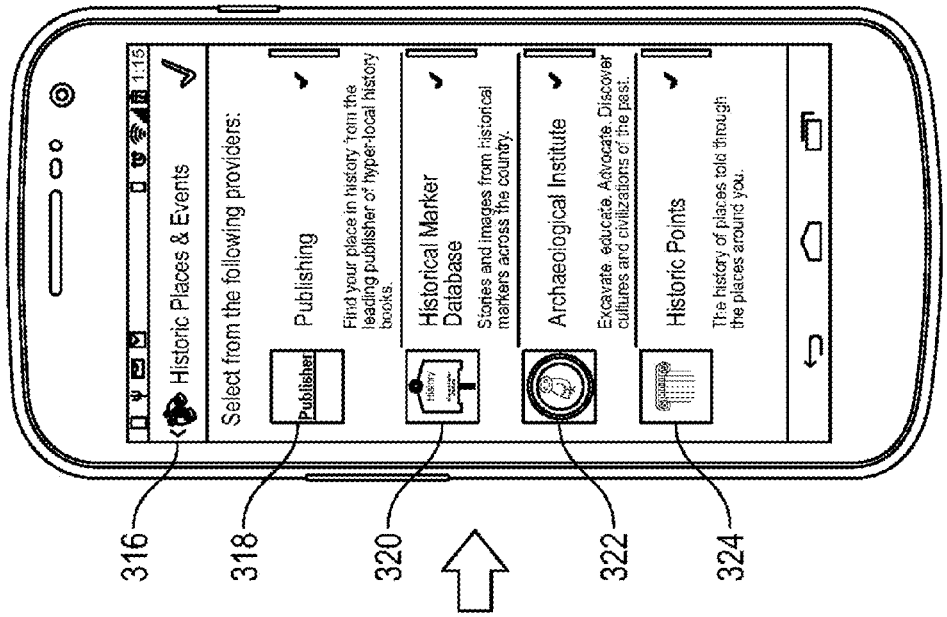
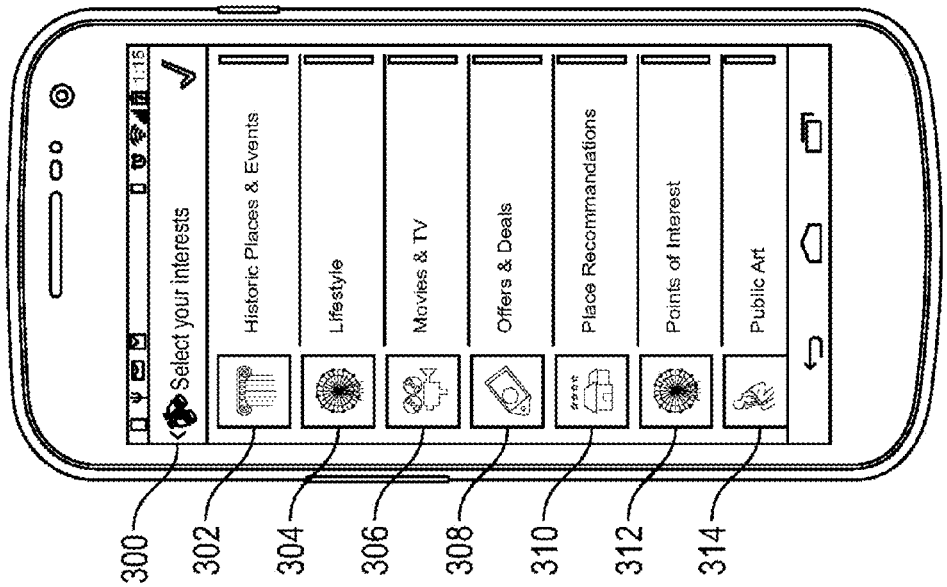
FIG. 3B
FIG. 3A

NOTIFICATION RELATED TO PREDICTED FUTURE GEOGRAPHIC LOCATION OF MOBILE DEVICE

CROSS REFERENCE TO RELATED APPLICATIONS

This application claims priority under 35 U.S. C. §119(e) and the benefit of U.S. Provisional Application No. 61/691,760, filed Aug. 21, 2012, and entitled, "GEO-LOCATION BASED CONTENT PUBLISHING PLATFORM," U.S. Provisional Application No. 61/691,763, filed Aug. 21, 2012, and entitled, "SCROLLABLE NOTIFICATIONS," and U.S. Provisional Application No. 61/691,765, filed Aug. 21, 2012, and entitled, "NOTIFICATION RELATED TO PREDICTED FUTURE GEOGRAPHIC LOCATION OF MOBILE DEVICE," the entire disclosures of which are incorporated herein by reference.

FIELD

The subject technology generally relates to mobile device applications and, in particular, relates to receiving a notification related to a predicted future geographic location of a mobile device.

BACKGROUND

Mobile users often query a particular website or system for information of interest to the user (e.g., a nearby restaurant, or another point of interest). Users also set up alerts about certain items of interests, e.g., an alert when a new text message or email message is received. Typically, content supplied to users is based on a user-initiated request as described above. In some cases, a driver of a motor vehicle may be interested learning about points of interest that he/she is approaching using his/her mobile device.

The mobile device may be configured to display information (e.g., text) via a screen. However, viewing text on a screen while a user is traveling or moving may be inconvenient. The mobile device may be configured to determine its current geographic location.

SUMMARY

The disclosed subject matter relates to a computer-implemented method for receiving a notification related to a predicted future geographic location of a mobile device. The method includes determining a plurality of geographic locations of the mobile device, where each of the plurality of geographic locations is associated with a timestamp. The method includes determining a speed of the mobile device based on at least a subset of the plurality of geographic locations and associated timestamps. The method includes predicting a future geographic location of the mobile device based on the speed and at least one geographic location from among the plurality of geographic locations. The method includes providing, to a server, a representation of the predicted future geographic location of the mobile device. The method include receiving, from the server, in response to the provided representation of the predicted future geographic location of the mobile device, a notification related to a point of interest associated with the predicted future geographic location of the mobile device. The method includes, if the speed of the mobile device exceeds a threshold speed, providing an audio output corresponding to the notification. The method includes, if the speed of the mobile device does not exceed the threshold speed, providing a visual output corresponding to the notification.

The disclosed subject matter relates to a computer-readable medium encoded with executable instructions for receiving a notification related to a predicted future geographic location of a mobile device. The instructions include code for determining a plurality of geographic locations of the mobile device, where each of the plurality of geographic locations is associated with a timestamp. The instructions include code for determining a motion vector of the mobile device based on at least a subset of the plurality of geographic locations and associated timestamps, where the motion vector includes a speed of the mobile device and a direction of the mobile device. The instructions include code for predicting a future geographic location of the mobile device based on the motion vector and at least one geographic location from among the plurality of geographic locations. The instructions include code for providing, to a server, a representation of the predicted future geographic location of the mobile device. The instructions include code for receiving, from the server, in response to the provided representation of the predicted future geographic location of the mobile device, a notification related to a point of interest associated with the predicted future geographic location of the mobile device. The instructions include code for, if the speed of the mobile device exceeds a threshold speed, providing an audio output corresponding to the notification. The instructions include code for, if the speed of the mobile device does not exceed the threshold speed, providing a visual output corresponding to the notification.

The disclosed subject matter further relates to a system. The system includes one or more processors. The system also includes a memory that includes instructions that, when executed by the one or more processors, cause the one or more processors to implement a method for facilitating receipt of a notification related to a predicted future geographic location of a mobile device. The instructions include code for determining a plurality of geographic locations of the mobile device, where each of the plurality of geographic locations is associated with a timestamp. The instructions include code for determining a speed of the mobile device based on at least a subset of the plurality of geographic locations and associated timestamps. The instructions include code for predicting a future geographic location of the mobile device based on the speed and at least one geographic location from among the plurality of geographic locations. The instructions include code for providing, to a server, a representation of the predicted future geographic location of the mobile device. The instructions include code for receiving, from the server, in response to the provided representation of the predicted future geographic location of the mobile device, a notification related to a point of interest associated with the predicted future geographic location of the mobile device. The instructions include code for providing an alert in response to receiving the notification related to the point of interest. The instructions include code for receiving, from a user, in response to the alert, an indication of intent to interact with the notification. The instructions include code for, if the speed of the mobile device exceeds a threshold speed, providing an audio output corresponding to the notification in response to the indication of intent to interact with the notification. The instructions include code for, if the speed of the mobile device does not exceed the threshold speed, providing a visual output corresponding to the notification in response to the indication of intent to interact with the notification.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

FIGS. 3A and 3B are example user interfaces for a mobile device for a geographic location based content publishing system.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, some structures and components are shown in block diagram form in order to avoid obscuring the concepts of the subject technology.

Typically, content supplied to users is based on a user-initiated request, and requires a preexisting knowledge by the user of what kind of information the user is seeking, e.g., by using keywords for searches, users specify the type of content that is of interest to the them. In the case of alerts, users specify the type of information of interest to them in the configuration (e.g., emails or text messages, etc.)

The subject technology provides, among other things, systems and techniques for discovering information or content items based on a mobile user's location. In various aspects, a user's geographic location is used to determine what content to publish to the user, referred to herein as a Geo-location based content system (GLC system).

For example, a GLC system may act as a "local guide" for a mobile device user. The user may travel around in a city neighborhood and interesting facts about nearby items may be published to the user's phone. Such facts may include information about a historic building that the user is approaching, information about various nearby art pieces, information about nearby interesting points to visit, information about nearby restaurant deals, or any other content related to the user's geographic location.

Figure 1:
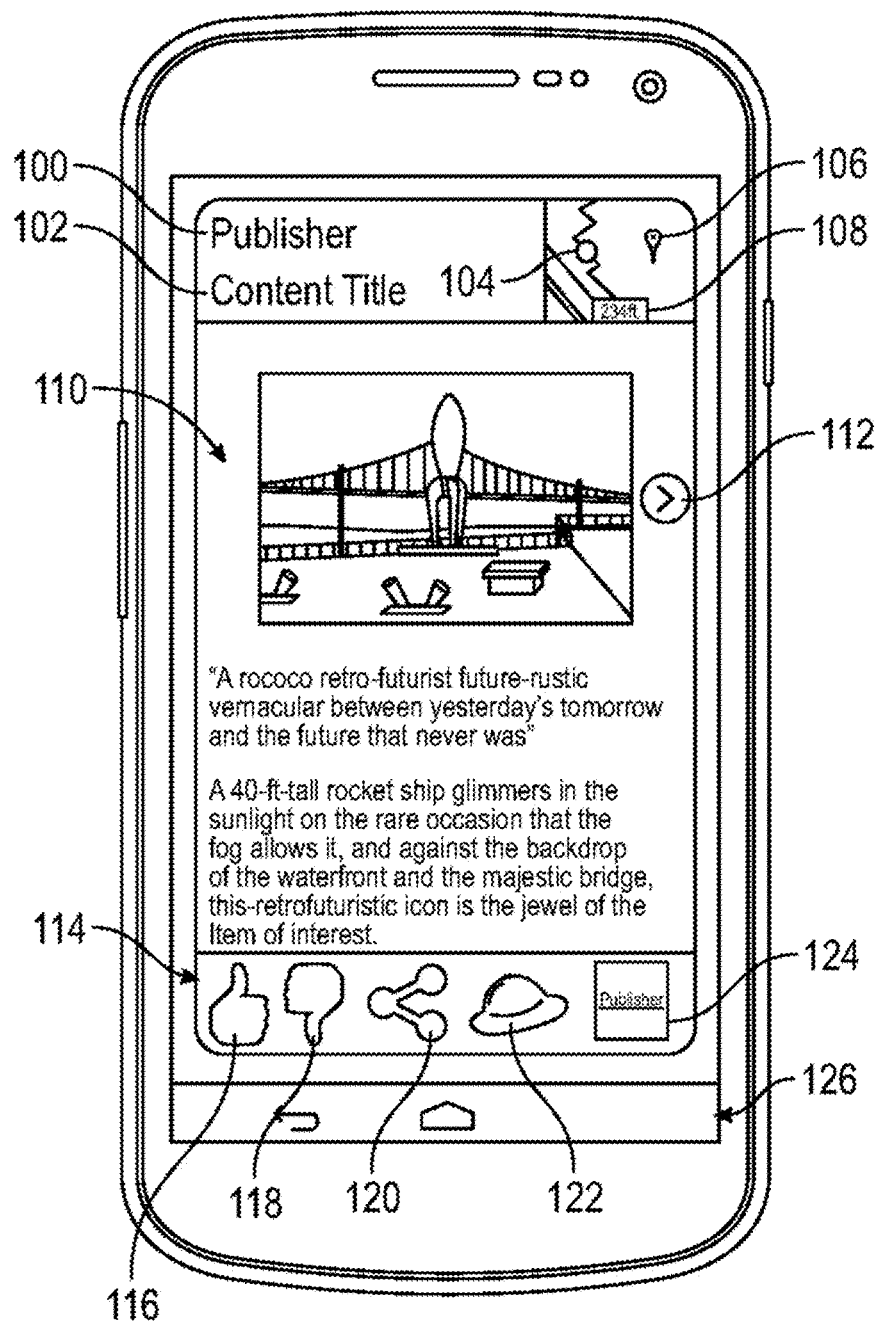
FIG. 1 is an example of a user interface for a mobile device for a geographic location based content publishing system.

FIG. 1 depicts an example of a user interface for a mobile device for a location based content publishing system. The example user interface of FIG. 1 is one example of a notification displayed on a locked or unlocked user screen upon content published to a user's mobile device. FIG. 1 depicts a user interface identifying a publisher 100 and content title 102. The publisher 100 or a server associated with the publisher 100 may transmit, to the mobile device for display at the mobile device, the name, logo, and other information about the publisher. Content title 102 may provide a header type information about the content, such as text and images, about the content. Publishers may be able to provide customized background and look and feel for the portions of FIG. 1 that contain publisher information. As used herein, the term "notification" may refer to information transmitted to a mobile device from a server (e.g., a server associated with the publisher 100) for display at the mobile device.

FIG. 1 also depicts an indication of a location 104 associated with the published content (e.g., shown as a circle), an indication of the user's location 106 (e.g., shown as a pinhead), and distance information 108, providing distance information between points 104 and 106. In some aspects, the location 104 and the user's location 106 are displayed on an interactive map. A user may be enabled to click on the location 104 or location 106 or other points on the map to zoom in, zoom out or move around a map application.

The user interface depicted in FIG. 1 includes a content section 110. Content section 110 provides details about the content containing items such as images, text, audio, or video about the published content item. Content section 110 may also contain an arrow icon 112, pointing to either the left, right or both, indicating that a next content item may be retrieved by pressing the arrow icon 112.

The user interface depicted in FIG. 1 includes a publishing content toolbar 114. Toolbar 114 contains user endorsement icon 116, indicating that the user likes or otherwise endorses the published content item displayed in FIG. 1. Toolbar 114 also contains an icon 118, indicating a user disapproval/dislike of the published content item displayed. Icon 120 of toolbar 114 provides a mechanism by which the published content can be shared with other users (e.g., provided to a social networking platform for sharing with friends of the mobile user).

Icon 122 of toolbar 114 allows the user to select different modes for receiving geo-location based content, which will be described in greater detail with reference to FIG. 4A. In some aspects, a user event received by selecting icon 122 may lead to changing the user's publishing content mode to an "explore" mode, indicating a user desire to receive more content to explore the surroundings.

Icon 124 of toolbar 114 provides some information about the publisher. Selecting icon 124 may lead to receiving a pop-up (or other notification) that provides more information about the publisher, which will be described in greater detail with reference to FIG. 4B. The user interface depicted in FIG. 1 also includes a control region 126 that includes a back button and a home button for navigating within the user interface.

Figure 2:
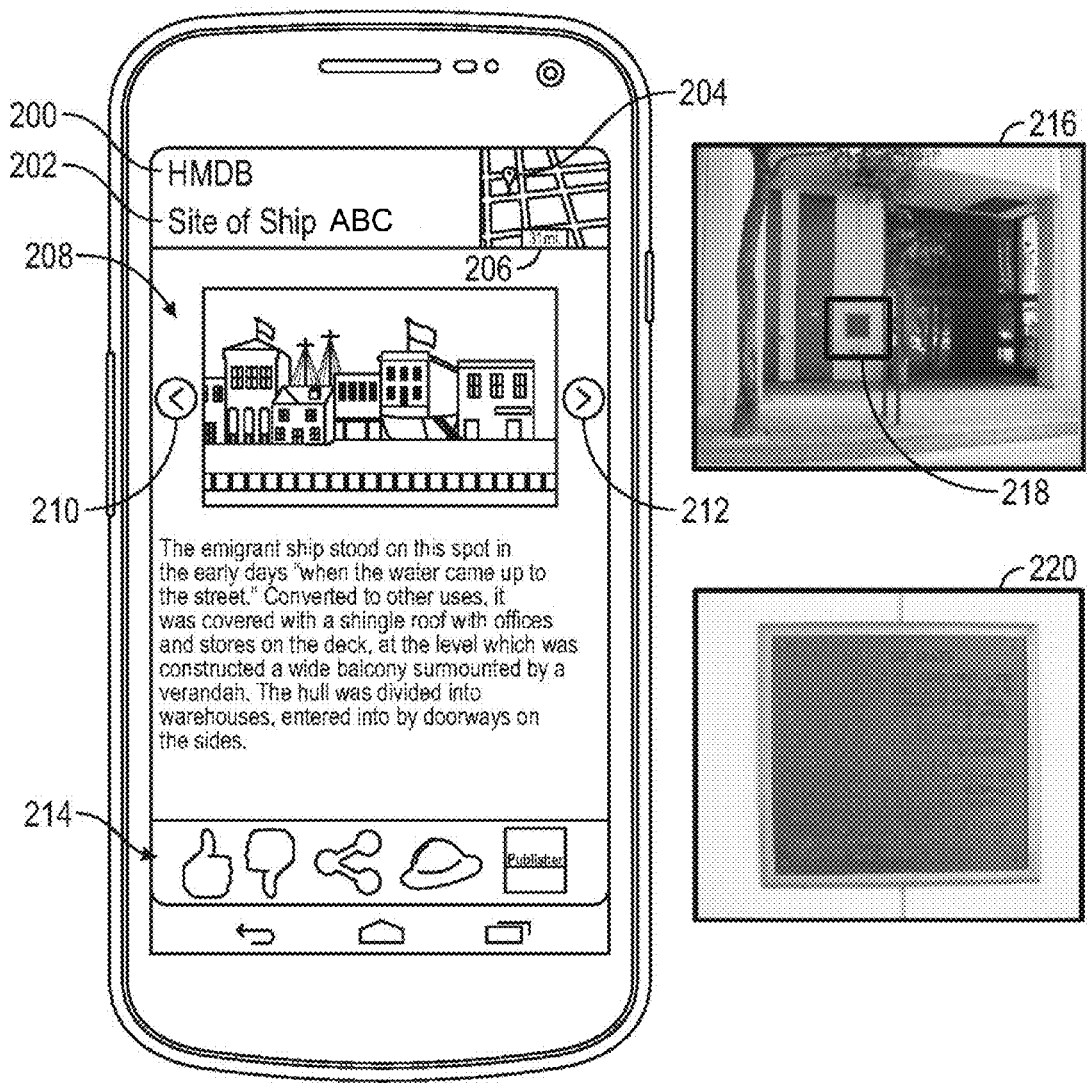
FIG. 2 is another example of a user interface for a mobile device for a geographic location based content publishing system.

FIG. 2 depicts another example of a user interface for a mobile device for a location based content publishing system. The example user interface of FIG. 2 provides another example of a user interface containing published content on a user's mobile device. FIG. 2 shows an example where a user walking by a building 216 containing a historic marker 218 that has details or information depicted in item 220 causes a notification to show up on a user's mobile device.

The user interface identifies a publisher "HMDB" 200 and content title "Site of Ship ABC" 202. Pin icon 204 provides an indication of the user's location and distance 206 provides information about a distance between the user's location and the historic marker 218. Content section 208 provides more information about the historic marker 218 such as an image and information about the historic marker 218 provided as text. Content section 208 may include other types of data such as audio and video. Arrow icons 210 and 212 allow the user to go the previous or the next content item found to be near the user's location 204. Toolbar 214 has the items discussed for toolbar 114 for FIG. 1.

FIGS. 3A and 3B depict example user interfaces for a mobile device for a geographic location based content publishing system. FIG. 3A provides a user interface by which users of a GLC system may select or subscribe to publisher feeds of interest to the users. Selecting a category from the provided category list of items 302-314 leads to a user interface depicted in FIG. 3B to be displayed on the user's mobile device. A user may then use interface provided in FIG. 3B to select publisher feeds for the selected category from FIG. 3A.

Item 300 provides an indication to the user that the user may select topic areas of interest from the below list, containing items 302-314. Items 302-314 provide various examples of topics that the user may select: "Historic Places and Events 302", "Lifestyle" 304, "Movies & TV" 306, "Offers and Deals" 308, "Place Recommendations" 310, "Points of interest" 312, and "Public Art" 314. In some aspects, as a user makes a category selection from items 302-314, a user interface as depicted in FIG. 3B is displayed for the user to select publisher feeds for the selected category.

FIG. 3B provides an example user interface containing a list of publisher feeds for a selected category (e.g., from FIG. 3A). User interface of FIG. 3B provides a category title 316, providing an indication to the user of the selected category from FIG. 3A. Items 318-324 provide various publishers available for the selected category 316 for user selection to subscribe to content from. The publishers provided in the example category 316 of "Historic Places and Events" are: "Publisher" 318, "History" 320, "Archeological Institute" 322, and "Historic Points" 324. Each respective publisher is depicted with an icon, a title, and a brief synopsis about the content it provides. In the example user interface of FIG. 3B, a user is able to select one or more of the provided items 318-324, and a checkmark indicated the selected or subscribed items. The items may include feeds.

Figure 4B:
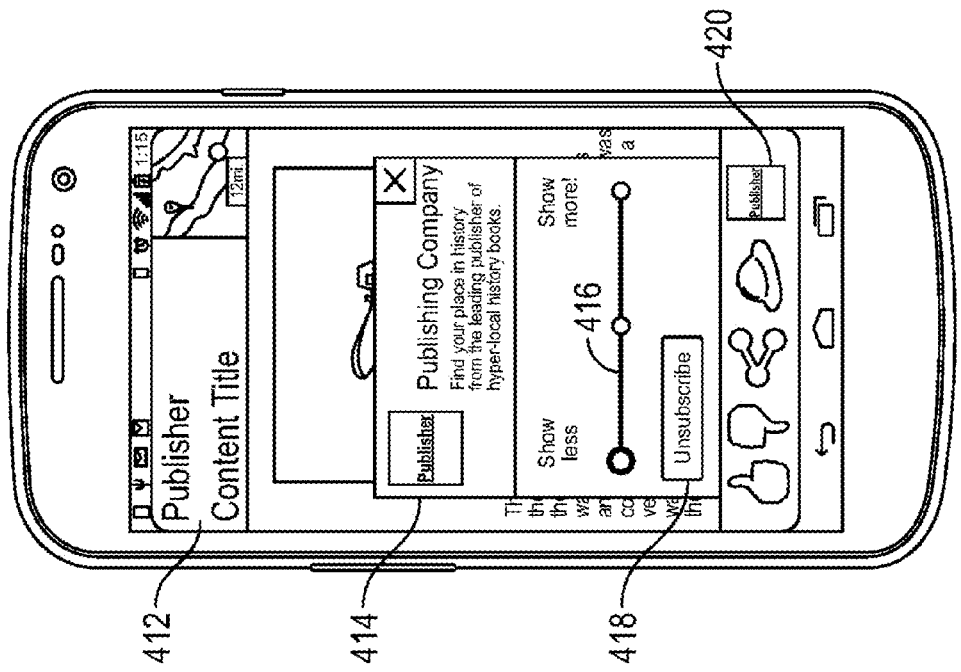
FIGS. 4A and 4B are example user interfaces for a mobile device for a geographic location based content publishing system.
Figure 4A:
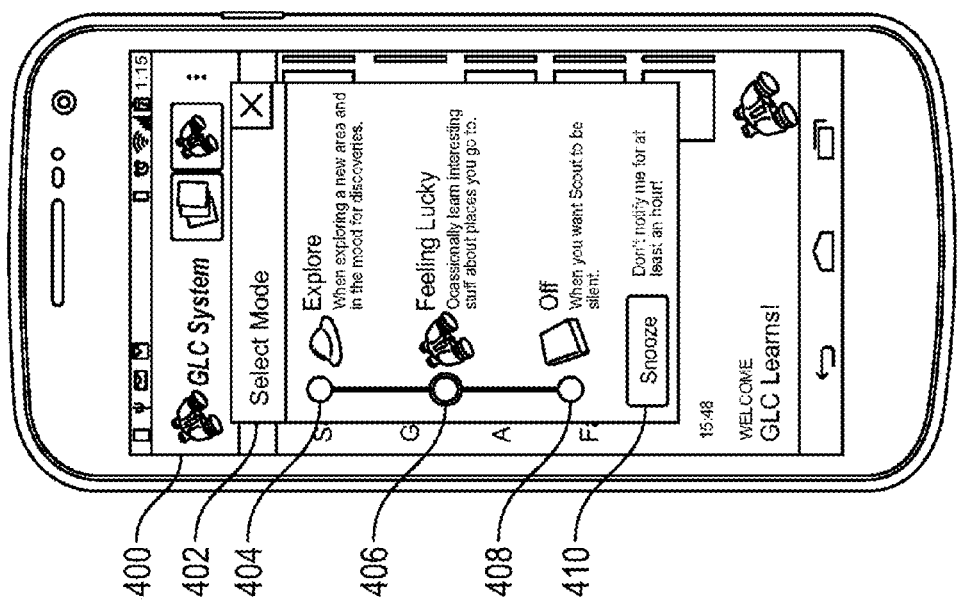

FIGS. 4A and 4B depict example user interfaces for a mobile device for a geographic location based content publishing system. FIG. 4A provides a user interface by which a user may select the mode by which to receive published content. Item 402 provides an indication to the user that a mode for publication may be selected using the interface provided in FIG. 4A. A user may select, for example, an "Explore" mode 404, a "Feeling Lucky" mode 406, an "Off" mode 408, and a "Snooze" mode 410.

A caption associated with each mode respectively further explains the mode choice. "Explore" mode 404 is shown to be associated with a user choice to receive more frequent content discoveries as indicated by the caption next to it stating "When exploring a new area and in the mood for discoveries." This indicates the GLC system may look for location-based content more frequently or may provide more content items (e.g., by searching for a larger area of content items near a user's current or anticipated position).

The "Feeling Lucky" mode 406 provides a caption of a medium level desire to explore a user's surroundings, stating "Occasionally learn interesting stuff about places you go to." The "Off" mode 408 is used when a user desires the GLC system to be turned off, meaning no location-based notifications will be provided to the user. And the "Snooze" mode 410 provides a mode by which a user may temporarily disable GLC system based notifications.

FIG. 4B provides an example user interface by which a user may control the amount of content desired from a particular publisher feed. FIG. 4B displays item 412 indicating the publisher name for which the control user interface is provided. Item 414 provides more information about the publisher, such as an icon, a title, and a brief synopsis of the type of content provided by publisher 412. Sliding bar 416 allows a user to control the amount of content desired from publisher 412. Sliding bar 416 depicts three states of "Show less", "Show more", or a middle state. Also, action item 418 allows a user to unsubscribe to a feed previously subscribed to.

The example user interface provided in FIG. 4B may be a launched as a result of a user selecting menu item 420 of the toolbar. A user selection of the menu item 420 may lead to the display of the user interface depicted in FIG. 4B by which a user may control the amount of content desired for the particular publisher. The user interface of FIG. 4B may be launched from other screens as well, for example, a user selection of a particular publisher feed for subscription (as discussed for FIG. 3B) may result in the interface of FIG. 4B to be displayed. Irrespective of what launches the user interface of FIG. 4B, it provides an example of how a user may control content from particular publisher feeds.

Figure 5:
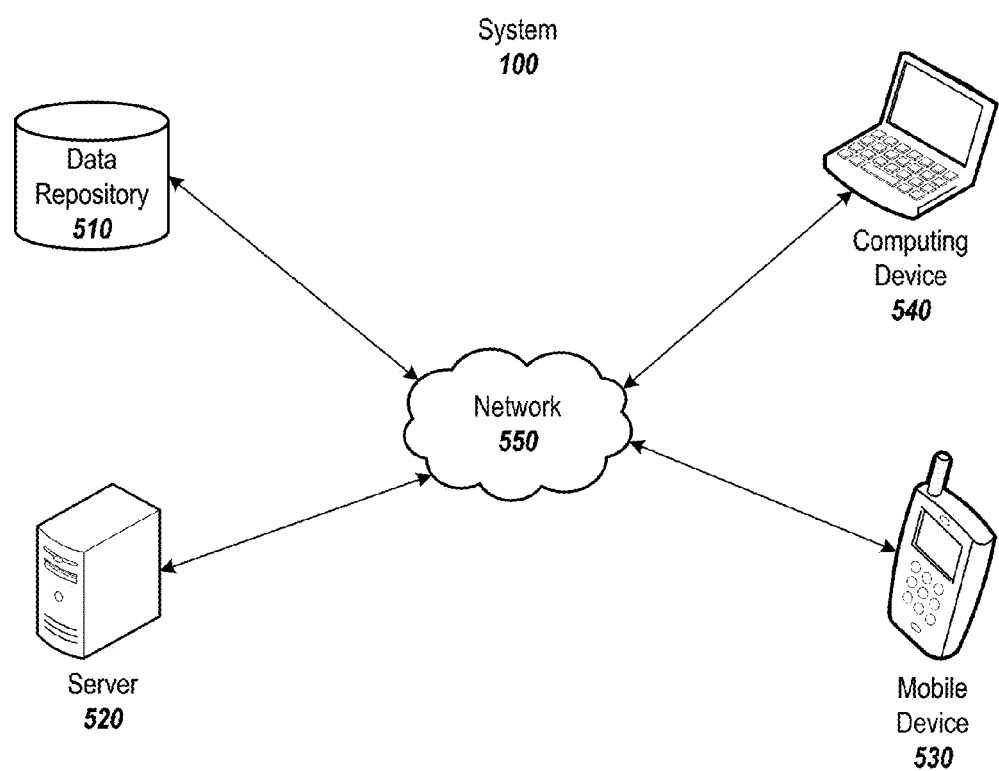
FIG. 5 illustrates an example of a network environment which can provide for location-based content publishing.

FIG. 5 illustrates an example of a network environment which can provide for location-based content publishing. As shown, the network environment 500 includes a data repository 510, a server 520, a mobile device 530 and a computing device 540. Data repository 510 may be any type of data repository (e.g., a relational database, an object-oriented database, a web application server, a file, or any other data storage) that can maintain and provide data used by the GLC system. The data repository 510, the server 520, the mobile device 530, and the computing device 540 may be configured to communicate with one another via a network 550. The network 550 may include the Internet, an intranet, a local area network, a wide area network, a wired network, a wireless network, a cellular network, a WiFi network, or a virtual private network (VPN).

The data repository 510 may store data (e.g., content information such as actual content data, associated location information, associated expiration date or time frame information, user subscription information, user mode selection, etc.) related to a GLC system. Data repository 510 may also maintain multiple data indexes as appropriate for content publishing, e.g., content location index, content expiration index, user subscription index.

The server 520 may include a module for receiving location-based content and a module for selecting and publishing location-based content. The server 520 may be implemented as a single machine with a single processor, a multi-processor machine, or multiple machines with multiple processors. One example of the server 520 is described in more detail in conjunction with FIG. 6 below.

The mobile device 530 may be a mobile phone, a personal digital assistant (PDA), a tablet computer, a netbook, a laptop computer, or any other type of mobile computing device. The mobile device 530 may be portable and may often times be carried by a user, for example, in a pocket, a purse, a backpack, or a briefcase. The mobile device 530 may also include a mobile browser or a mobile application configured to subscribe to publisher feeds and to receive notifications about content in its vicinity. While only one mobile device 530 is illustrated in FIG. 5, the subject technology may be implemented in conjunction with one or more mobile devices 530.

The computing device 540 may be a laptop computer, a desktop computer, a mobile phone, a personal digital assistant (PDA), a tablet computer, a netbook, a television with one or more processors embedded therein or coupled thereto, a physical machine, or a virtual machine. The computing device 540 may include one or more of a keyboard, a mouse, a display, or a touch screen. The computing device 540 may also include a mobile browser or a mobile application configured to subscribe to publisher feeds and to receive notifications about content in its vicinity. The computing device 540 may also include a mobile browser or a mobile application configured to predict a future geographic location of the mobile device and/or receive a notification related to a predicted future geographic location of the computing device 540, for example, as described in conjunction with FIGS. 9, 10, and 11A-11B below.

While each of the data repository 510, the server 520, the mobile device 530, and the computing device 540 are illustrated in FIG. 5 as separate machines, in example aspects, one or more of the data repository 510, the server 520, the mobile device 530, and the computing device 540 may be implemented as a single machine. For example, the functions of the data repository 510 and the server 520 may be implemented within a single machine.

Figure 6:
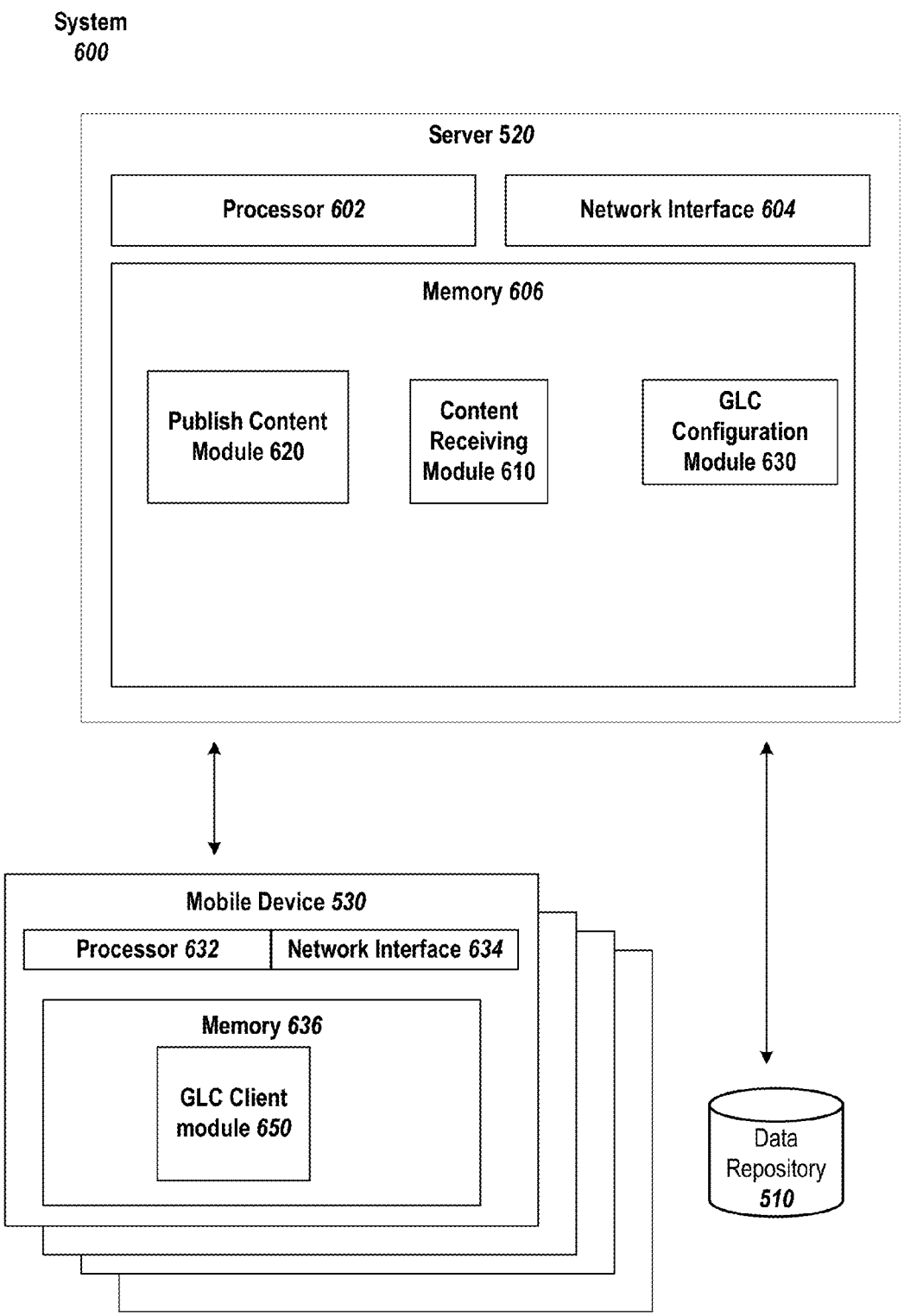
FIG. 6 illustrates an example of the server and mobile device of FIG. 5.

FIG. 6 illustrates an example of the server and mobile device of FIG. 5. As shown, the mobile device 530 is connected to server 520. Mobile device 530 may send requests for location-based content to server 520 and receive location-based content from server 520 via its connectivity to server 520. Server 520 may communicate with data repository 510 to store content feeds received from publishers, user subscriptions and other preferences, to retrieve content items based on content location information, etc. via its connectivity to data repository 510.

As shown, the server 520 includes a processor 602, a network interface 604, and a memory 606. The mobile device 530 includes a processor 632, a network interface 634, and a memory 636. The processors 602 and 632 are configured to execute computer instructions that are stored in a computer-readable medium, for example, the memory 606 or the memory 636 respectively. The processor 602 or 632 may be a central processing unit (CPU). While only one processor 602 is illustrated in the server 520, the server 520 may include multiple processors. Similarly, while only one processor 632 is illustrated in the mobile device 530, the mobile device 530 may include multiple processors. Furthermore, while the server 520 is illustrated as a single machine, the server 520 may include multiple machines, e.g., within a server farm. Also, mobile device 530 is depicted as multiple mobile devices that communicate with server 520 to receive location-based content from server 520.

The network interface 504 and 534 are configured to allow the server 520 and mobile device 530 and data repository 510 to transmit and receive data in a network, e.g., network 550 of FIG. 5. The network interface 504 and 534 may include one or more network interface controllers (NICs). The memory 506 and 536 may store data and/or instructions.

As illustrated, the memory 506 includes a content receiving module 610, a publish content module 620, and a GLC configuration module 630. The memory 636 of mobile device 530 includes a GLC client module 650. FIG. 6 also shows the data repository 510 of FIG. 5.

Content receiving module 610 is configured to receive, from a computing device (e.g., computing device 540 or mobile device 530), a content feed containing one or more content items for publication. Content feed items may be provided by various publishers as discussed above. Content provided within a content feed may include text, image, video, or audio file(s) and information associated with the file(s) specifying where the file(s) are to be published. The information associated with the file(s) may include geographic location information, a start or expiration date, or a periodicity or timeframe where/when the content is to be published. For example, a content feed may include information about holiday celebrations at a government building. This content may be published within 50 meters of the government building every year during the three weeks immediately before the holiday. The time and location of publication may be specified by the publisher. In another example, one content item may include an image about the content, some text describing the content item in more detail, a latitude coordinate associated with the content, a longitude coordinate associated with the content, and an expiration date. A content feed may contain multiple content items.

Content items may be provided (by publishers) to content receiving module 610, having associated with content items a periodicity interval for the one or more of the content items. The periodicity may be provided for recurring events content. For example, a Christmas holiday event that occurs annually may have a periodicity of one year and may also have start and end dates for the event. Then as subscribed mobile users approach the proximity of the event's location, e.g., the city or area of the city hosting the event, content information about the event may be published to the user if the date is within the start and end date of the content. Such an event's date may be reset every year based on the periodicity of one year for the event. In one aspect, content receiving module 610 may check for the periodicity of the event, upon expiration or end date of the event, and upon expiration date the content receiving module 610 may update the start and end date, e.g., to the next year for the provided example.

Content receiving module 610 is configured to receive content items or publisher feeds, process the received data and store content items (e.g., in data repository 510) for use by a GLC system. For example, content receiving module 610 may receive a comma separated file from a publisher. Each content item may be denoted by a newline character, while each comma separated item may represent various attributes of information about the content item. Content receiving module 610 may then, parse content items in the comma separated file by each newline character to retrieve data rows of content items, and separate each row of content items by commas to retrieve attributes about each content item row. Content receiving module 610 may then store the parsed content items in the data repository 510 or any other data store.

Content receiving module 610 may receive data from various publishers in various formats. One example of a comma-separated file is described above. Content receiving module 610 may receive content items in various other formats, e.g., XML based file formats, RSS feeds, etc. Content receiving module 610 may process the content items differently depending on the format of the data received. Content items or publisher feeds may be received as files periodically or through other connection-oriented or connectionless communications (e.g., RSS feeds, HTML posts, etc.). Once the content items data is processed, it may be stored in a data repository 510 for later use by a GLC system to publish content to mobile users.

Publish content module 620 may receive periodic requests to search for location-based content from an application or GLC client module 650 running on a mobile client device, e.g., a mobile device 530. The GLC client module 650 for a GLC system may be configured to communicate with publish content module 620 to initiate a request for location-based content. The GLC client module 650 may also be configured to calculate the requesting mobile device's location and provide it to publish content module 620, along with the request. In some aspects, GLC client module 650 requests location-based content items every threshold time period, for example, every three minutes.

GLC client module 650 may dynamically adjust the periodicity of requests (e.g., as measured by a period of time between requests, for example, one request every 20 seconds, 30 seconds, two minutes, five minutes, ten minutes, etc.) for location-based content based on a pace measured, for example, in kilometers per hour, of the mobile device's movement. For example, if a user is determined to be moving at a rapid pace (e.g., a pace exceeding a threshold speed, where the threshold speed may be 20 kilometers per hour, 30 kilometers per hour, 50 kilometers per hour, etc), more frequent (e.g., having a frequency in excess of a frequency threshold, e.g., once every 45 or fewer than 45 seconds) requests may be made (e.g., one every 30 seconds). Where the GLC client module 650 determines that the user is moving at a less rapid pace, which is below the threshold speed, e.g. a user stops to eat lunch, then requests may be transmitted at a lower frequency (e.g., below the frequency threshold). For example, requests may be transmitted once every 5 minutes. Alternatively, the GLC client module 650 may not issue any further requests until the mobile device is detected to have moved at least a threshold distance (e.g., at least 300 meters) from a previously calculated location of the mobile device. The movement or absence of movement of the mobile device may be detected via a motion sensor or gyroscope within the mobile device, and the GLC client module 650 may adjust the frequency with which the GLC client module 650 requests updates based on the detected movement or absence of movement.

The GLC client module 650 may also take into account a selected mode by the user (as discussed in more details for FIG. 4A) to determine how often to request for location-based content notifications. For example, if a current mode is set to "Explore" then more frequent requests may be made then if the selected mode is "Feeling Lucky". If the selected mode is "Snooze" then no requests may be issued until a snooze period has elapsed. Where a selected mode is set to "Off" then no requests for location-based information are issued until the mode is changed.

Publish content module 620 is configured to select content nearby a user's location upon receiving a request for location-based content items. For example, publish content module 620 may periodically (e.g., every 3 minutes) receive a request from the GLC client module 650 of a mobile user to query for location-based content. The request may include with it information about the current or anticipated location of the mobile device. In some aspects, publish content module 620 may itself calculate the current or anticipated location of a requesting mobile device, for example, based on a received past geographic location of the mobile device and received travel direction and travel speed information from the mobile device. Publish content module 620 may be configured to search data repository 510 to select content records that are within a certain proximity of the provided or calculated user location.

In various aspects, publish content module 620 takes into account multiple factors for selecting content items nearby or in proximity of a user's current or anticipated location. In some aspects, a user's selected mode for a GLC system (e.g., "Explorer" mode, "Feeling lucky" mode, etc. as described in reference to FIG. 4A) is taken into account. For example, where a user has selected "Explore" mode an algorithm for selecting nearby content items may be relaxed, e.g., the algorithm may select content items further away from the user than would be otherwise selected (e.g., may select content items up to 500 meters away from a user's current or anticipated location). As another example, where a user has selected "Feeling lucky" mode, the algorithm may select content items closer to the user than in the "Explore" mode (e.g., select content items up to 50 meters away from a user's current of anticipated location). The threshold distances of 500 and 50 meters provided in the above examples may vary depending on various ranking factors. For example, where a user has indicated she wants more content from a specific feed, as described in reference to FIG. 4B, then the algorithm may increase the threshold distance for content from that particular feed.

In some aspects, where a user has selected a "Feeling Lucky" mode, the algorithm takes into account both a user's location and the uncertainty associated with the user's location, and a content item's location and the uncertainty associated with the content item's location, in determining whether or not the content item should be selected for notification to the user. In certain aspects, the algorithm considers how much area of the user's location circle is contained in the content item's location circle. As such, notifications are shown for content items that have a large enough probability that the user is close to the content items, based on the amount of overlapping of the circles. Variations on the algorithm, for selecting content items considered to be nearby a user's current or anticipated location, may exist without deviating from the scope of this disclosure. The uncertainties associated with the user's and the content item's locations may be used to determine a distance range between the user and the content item. For example, if the user is within 0.5 miles of point A and a specified content item is within 0.5 miles of a point 3 miles away from point A, the distance between the user and the content item is between 2 miles and 4 miles. The user may have requested, via the mobile device, to receive information about a large number of content items within a 3 mile radius of his/her position and thus, may receive the information about the specified content item. Alternatively, if the user has requested, via the mobile device, to receive fewer content items, the user may not receive the information about the specified content item.

Publish content module 620 may also be configured to determine if the selected nearby records are still valid. For example, a query for location-based content may check a start and end date associated with the selected content items to ensure the content items are still valid and not expired. The publish content module 620 may also be configured to select only those valid location-based content items that originate from publisher feeds that the requesting user has subscribed to. For example, one query may select all content items that originate from subscribed publisher feeds that are within a radius specified at the mobile device, for example, a two mile radius, of the user's provided current location, and that are still valid content items or not expired.

Publish content module 620 may provide one or more of the selected content items to the GLC client module 650 on the mobile user's device. The mobile device may be locked when it receives the selected content items. The GLC client module 650 may display information about the received content items as notifications on a locked or unlocked mobile device's screen. Examples of notification user interfaces are provided in FIGS. 1 and 2. A user may take an action on the provided user interfaces as discussed in more detail for FIGS. 1 and 2.

Publish content module 620 may rank selected content items before providing them to GLC client module 650 for display as notifications on the mobile device. The ranking may be based on a location of the user (e.g., as provided in the request or as calculated by publish content module 620), a location associated with the content items, the distance between the user and location associated with the content items, a point size of the content items, a ranking if any provided in association with the content items, interests of the requesting user, etc.

In some aspects, a point size comparison between two or more content items is considered for ranking the content items. In some aspects, each content item or point is associated with a circular shape, having a radius and a center point. For example, consider a user whose location is determined to be somewhere inside the Golden Gate park in San Francisco, standing in front of a sculpture inside the park. In this example, the radius associated with the sculpture is smaller than the radius associated with the park and the user is within both radii. Thus, information about the sculpture may be presented before information about the park, as the sculpture is associated with the smaller radius. The information about the sculpture may be more relevant to the user than information about the park, as the user is standing directly in front of the statue at the current time but may have already been in the park for several hours. Also, assuming that a GLC system's content items data repository contains two possible notifications, one for the park itself, and one for the sculpture. Then, the publish content module 620 may rank the sculpture higher than the park notification, because the user is likely more interested in the more specific notification at the time when she is standing in front of the sculpture. The park notification may still be provided at a later time, e.g., when the user walks through the park or is near the boundary of the park and no higher ranked notification for a content items exists.

In some aspects, a content item may be associated with a shape other than a circle, in addition to the circle shape described above. For example, a point size may be of the shape of another polygon or of an arbitrary shape, corresponding to an actual shape of a particular content item (e.g., the actual boundaries of the Golden Gate park may be provided as the shape for the point size). The selecting and ranking of content items may take into account a total area of the shape instead of a length of a radius. For example, if the user is standing within a 25 square meter rectangular region corresponding to a site of a first event and a 250 square meter circular region corresponding to a site of a second event, the first event may be more relevant as the first event is associated with a region with a smaller area.

Point size for a content item may be provided as information with the content feed. For example, publishers may provide along with the content item and location information, a radius for the content item. The radius provides a circular point size to use as the point size of the content item. In other aspects, data for shaped other than a circle may be provided as the point size. For example, date for the actual shape of the Golden Gate Park may be provided for the point size information and may be used as discussed above for ranking content items.

Publish content module 620 may take into account interests of the requesting user of the mobile device when ranking selected content items. For example, the publish content module 620 may have information about a user's interests based on past feed items for which the user or other users of the GLC system provided a positive/negative endorsement (e.g., as described in FIG. 1, item 116). The publish content module 620 may modify content items provided to the user based on the user's endorsements. For example, items similar to positively endorsed items may be provided to the user more frequently, while items similar to negatively endorsed items may be provided to the users less frequently. The user may affirmatively opt-in to having the server 520 or the data repository 510 store his/her interests or endorsements or the user may opt-out of having the server 520 or the data repository 510 store his/her interests or endorsements.

In some aspects, publish content module 620 ranks content items upon every request received for location-based content items, e.g., every three minutes or at some other periodic time interval that requests are received. In some aspects, content items may be ranked based on ranking(s) of the content items provided by the publisher(s) of the content items. For example, if a first publisher assigns five stars to content item A and a second publisher assigns three stars to content item B, content item A may be ranked higher than content item B. In various aspects, content items may be ranked by a batch process that runs at certain time intervals or upon triggering of an event such as receiving a publisher's feed (e.g., as opposed to with every request for location-based content items or in addition to every request for location-based content items). For example, content items may be ranked based on attributes of the content items, e.g., endorsements about the content item received by various users, the publisher feed from which the content item is received, etc. As such, content items may be ranked with every request, in some batch process prior to the request, or in some combination thereof (e.g., rank items in a batch and further rank content items upon receiving a request for location-based content items).

The publish content module 620 may access systems other than the GLC system described here to ascertain what items fit into the requesting user's interest area. For example, publish content module 620 may communicate with social networking systems to determine the user's interest areas. Past web usage history, e.g., past searches done by the user, may be used to determine to rank content items based on user's interests. For example, if a user searched for "Farmer's market" in a recent query then information relating to content items about fresh produce, etc., may be ranked higher for that user. A user's group of friends or other groups on social networking platforms may also be used to ascertain user interests. For example, if a user has a gaming circle of friends then content items relating to the gaming industry may be ranked higher for that user.

The publish content module 620 may take into account the desired amount of content items for a particular publisher's feed (as described in more detail for FIG. 4B) when selecting or ranking content items. For example, publisher feeds where a mobile device's user has specified a "Show More" level of content items (e.g., as described for FIG. 4B) may be ranked more highly then publisher feeds where the amount of desired content items is set to "Show less". The top one or more ranked items may be provided by publish content module 620 to GLC client module 650 for display as a notification or otherwise on the mobile device.

The publish content module 620 may provide different forms of notification based on information about a user's movement. For example, if a user of the mobile device is determined to be driving, then publish content module 620 may send an audio notification as opposed to the visual notification described for FIGS. 1 and 2.

The GLC client module 650 may maintain a set of content items received in a local cache or local data repository. The GLC client module 650 may maintain a history of content items provided to it by publish content module 620. The history may be maintained for a certain period of time and may be deleted based on system needs or system or user configuration parameters. In some aspects, a history of location-based content items may be accessible by a mobile device's user once the device is unlocked.

The GLC configuration module 630 is configured to register authorized publishers. A publisher may register to provide content to the GLC system through the GLC configuration module 630 by providing data to the GLC configuration module identifying the publisher's name, contact information, and/or types of content published by the publisher. For example, the GLC configuration module 630 may maintain a list of valid or authorized publishers of the GLC system (e.g., stored in data repository 510). GLC configuration module 630 may maintain information about the feed format that each publisher's feed is received in. Format information may be used by content receiving module 610 to determine how to process a feed received from a particular publisher.

The GLC configuration module 630 may be configured to maintain user subscriptions. For example, upon a user selection of a publisher feed (e.g., as described in FIGS. 3A and 3B), GLC client module 650 may communicate feed selections/subscriptions to GLC configuration module 630. GLC configuration module 630 may maintain and update subscription information about user selections in data repository 510. Unsubscribe events/messages may similarly be received by GLC configuration module 630 and used to update user subscription information. GLC configuration module 630 may also receive mode selection (e.g., as described in FIG. 4A) information from GLC client module 650 and maintain and update such information in, e.g., data repository 510. GLC configuration module 650 may also receive and maintain information about the desired content levels for particular publishers (e.g., as described in FIG. 4B).

Figure 7:
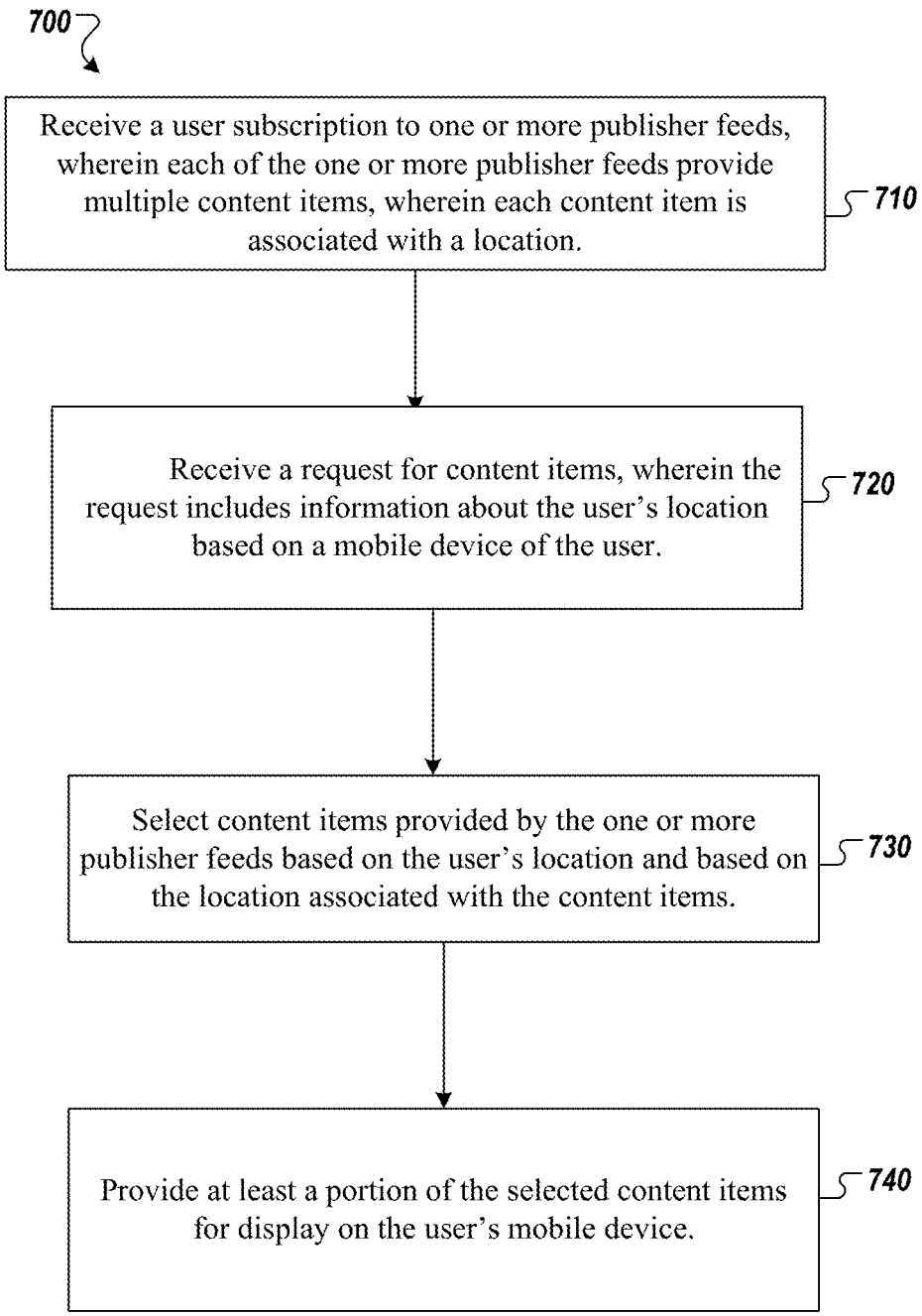
FIG. 7 is a flowchart of an example process for a location-based content publishing system.

FIG. 7 is a flowchart of an example process for location-based content system. Process 700 starts at step 710 upon receiving a user subscription to one or more publisher feeds. For example, a user may utilize the example user interfaces of FIGS. 3A and 3B to subscribe to available publisher feeds. A publisher feed as discussed above provides multiple content items from a particular publisher. Each content item in a publisher feed is associated with a location. In some aspects, the publisher of the feed provides location information associated with content items in the publisher feed. In some aspects, a GLC system may determine location information associated with content items based on information (e.g., address information) within the content items. For example, a review of a restaurant may specify the address of the restaurant and, thus, be associated with a geographic location corresponding to the address.

At step 720, a request for content items is received. The request includes information about the user's location based on a mobile device of the user. In some aspects, a mobile device transmits its geographic location to the server in conjunction with the request. At step 730, content items provided by the one or more publisher feeds based on the user's location and based on the location associated with the content items are selected. Content items may be further filtered, selected, or ranked based on various criteria as discussed above in more details (e.g., expiration dates or intervals, user mode selection, amount of desired content from a particular publisher, point size of content item, user location, content location information, etc.).

At step 740, at least a portion of the selected content items are provided for display on the user's mobile device. Content items may be displayed as notifications on a locked or unlocked screen as discussed in more details for FIGS. 1 and 2.

Figure 8:
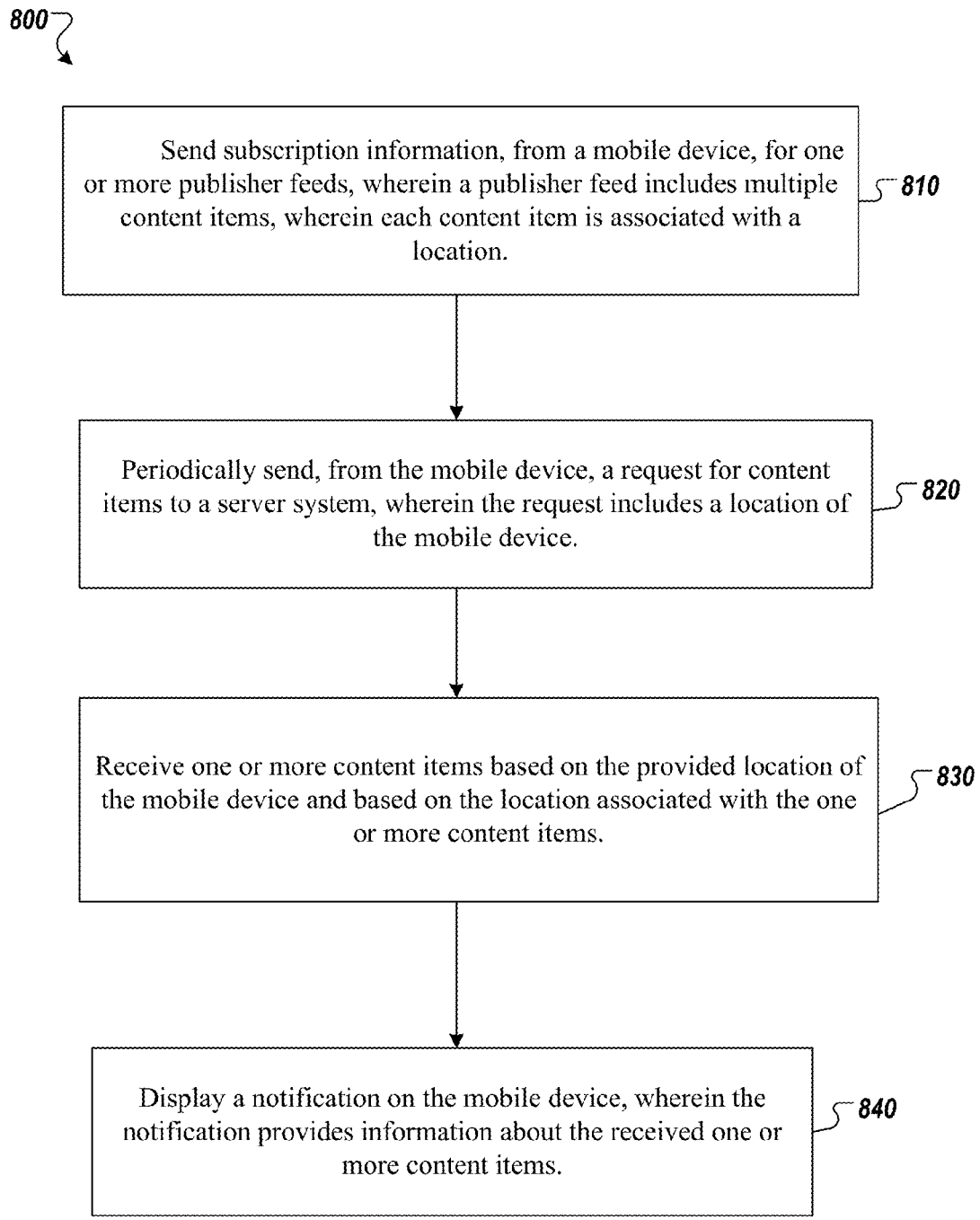
FIG. 8 is a flowchart of another example process for a location-based content publishing system.

FIG. 8 is a flowchart of another example process for a location-based content system. Process 800 starts at step 810 upon sending subscription information, from a mobile device, for one or more publisher feeds, wherein a publisher feed includes multiple content items, wherein each content item is associated with a location. For example, a user of a mobile device 530 may send subscription information (as discussed in more details for FIGS. 3A and 3B) for publisher feeds of interest to the user.

At step 820, the mobile device periodically sends a request for content items to a server system, wherein the request includes a location of the mobile device. As discussed above, the mobile device may send requests every certain time period (e.g., every 3 minutes or every 30 seconds). The time frame for receiving, from a server, location-based content items may be throttled based on various parameters as discussed above (e.g., the movement of the mobile device, the user mode selection, etc.).

At step 830, the mobile device receives one or more content items based on the provided location of the mobile device and based on the location associated with the one or more content items. At step 840, the mobile device displays a notification, wherein the notification provides information about the received one or more content items. (See FIGS. 1 and 2 for more details on notification of content items received).

Figure 9:
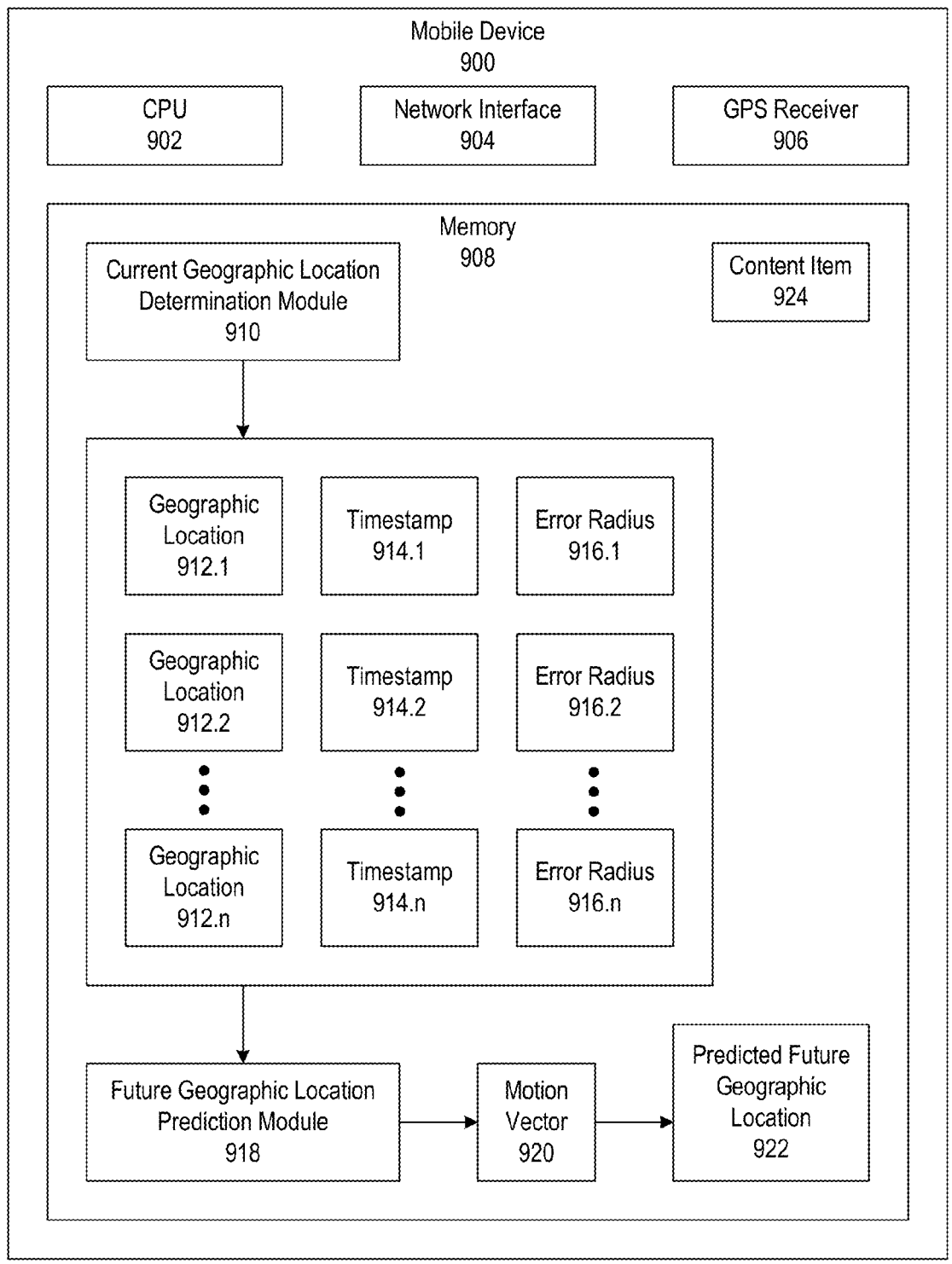
FIG. 9 illustrates an example of a mobile device configured to receive a notification related to a predicted future geographic location of the mobile device.

FIG. 9 illustrates an example of a mobile device 900 configured to receive a notification related to a predicted future geographic location of the mobile device 900. The mobile device 900 may correspond to the mobile device 530 of FIGS. 5-6. The mobile device 900 may be one or more of a mobile phone, a tablet computer, a personal digital assistant (PDA), a personal music player, or a laptop computer.

As shown, the mobile device 900 includes a central processing unit (CPU) 902, a network interface 904, a global positioning system (GPS) receiver 906, and a memory 908. The CPU 902 may include one or more processors. The CPU 902 is configured to execute computer instructions that are stored in a computer-readable medium, for example, the memory 906. The network interface 904 is configured to allow the mobile device 900 to transmit and receive data in a network, e.g., network 550, which may correspond to the Internet or a cellular network. The network interface 904 may include one or more network interface controllers (NICs). The GPS receiver 906 is configured to determine a geographic location based on received signal(s) from GPS satellites, for example, via triangulation of received signals from GPS satellites. However, the mobile device 900 may also determine its geographic location based a lookup of a location corresponding to one or more cellular access point signal(s) or WiFi access point signal(s) in a data repository or by triangulating three or more received cellular access point signal(s). The memory 908 stores data and/or instructions. The memory 908 may be one or more of a cache unit, a storage unit, an internal memory unit, or an external memory unit. As illustrated, the memory 908 includes a current geographic location determination module 910, a set of geographic locations 912.1-$n$ having associated timestamps 914.1-$n$ and error radii 916.1-$n$, a future geographic location prediction module 916, a motion vector 918, a predicted future geographic location 920, and a notification 922.

The current geographic location determination module 910 is configured to determine a current geographic location of the mobile device 900, for example, based on visible cellular of WiFi network access points or in response to the GPS receiver 906 being turned on by another application (e.g., a mapping application) executing on the mobile device 900. The current geographic location may be determined based on one or more of a GPS signal, a WiFi signal, a cellular network signal, triangulated GPS signals, triangulated cellular network signals, or triangulated WiFi signals.

In some aspects, the current geographic location determination module 910 may determine whether the mobile device 900 has moved since the mobile device 900 last received location-based content item(s) from the server. If the mobile device 900 has not moved, the current geographic location may be equivalent to the last determined geographic location of the mobile device 900 (i.e., the one of 912.1-$n$ associated with the latest timestamp 914.1-$n$). One way to determine whether the mobile device 900 has moved geographically is to periodically obtain the geographic location of the mobile device 900 via one or more cellular network signal(s), WiFi network signal(s), or GPS signal(s) and to compare the obtained geographic location with the last known geographic location. However, obtaining the geographic location in this manner may consume the battery of the mobile device 900. To avoid consuming the battery of the mobile device 900 (e.g., by using less power), the mobile device 900 may scan wireless network(s) around the mobile device 900 (e.g., visible to the mobile device 900) and obtain their identifiers (e.g., basic service set identifiers (BSSIDs)). In some examples, the identifiers of the wireless network(s) may be obtained in conjunction with signal strength(s). The obtained wireless network identifier(s) and/or signal strength(s) may be compared with the wireless network identifier(s) or signal strength(s) obtained during the last scan. The mobile device 900 may determine whether the mobile device 900 has moved based on the result of the comparison. For example, if one or more the obtained wireless network identifier(s) has not changed, the mobile device 900 may determine that the mobile device 900 has not moved. If each and every one of the obtained wireless network identifier(s) has changed and/or a signal strength of one or more of the obtained wireless network identifier(s) has changed, the mobile device 900 may determine that the mobile device 900 has moved.

Geographic locations 912.1-$n$ determined by the current geographic location determination module 910 may be stored within the memory 908. Each geographic location 912.1-$n$ may be represented as latitude and longitude coordinates, a street address, or any other representation of geographic location. As shown, each geographic location 912.$k$ is associated with a timestamp 914.$k$ and an error radius 916.$k$. The timestamp 914.$k$ may correspond to a time when the mobile device 900 was at the geographic location 912.$k$. The error radius 916.$k$ may correspond to a radius within which the geographic location of the mobile device 900 is known at the time the mobile device 900 is detected at the geographic location 912.$k$. For example, when a single cellular signal is used to determine the geographic location 912.$k$, the error radius 916.$k$ may be five kilometers. When GPS signal triangulation is used to determine the geographic location 912.$k$, the error radius 916.$k$ may be two meters.

The future geographic location prediction module 918 is configured to predict a future geographic location for the mobile device 900 based on all or a portion of the determined geographic locations 912.1-$n$. For example, the future geographic location prediction module 918 may determine a motion vector 920 for the mobile device based on all or a portion of the geographic locations 912.1-$n$ and the associated timestamps 914.1-$n$ and determine the predicated future geographic location 922 based on one or more of the geographic locations 912.1-$n$ (e.g., the geographic location 912.$k$ having a timestamp 914.$k$ with the latest time) and the motion vector 920. The motion vector may include a speed (e.g., 50 kilometers per hour) and a direction (e.g., north).

The predicted future geographic location 920 may be determined by the future geographic location predication module 916 in multiple ways. For example, a Kalman filter may be applied to all or a portion of the geographic locations 912.1-$n$ and the associated timestamps 914.1-$n$ or the motion vector 918 may be multiplied by a time (to obtain a displacement vector) and added to one of the geographic locations 912.$k$ (e.g., the geographic location 912.$k$ having a timestamp 914.$k$ with the latest time and an error radius 916.$k$ less than a threshold (e.g., 20 meters)).

As illustrated, the future geographic location prediction module 918 resides on the mobile device 900. However, in some aspects, the future geographic location predication module 918 may reside on a server, and the geographic locations 912.1-$n$ and the associated timestamps 914.1-$n$ and/or error radii 916.1-$n$ may be transmitted to the server. The server and the mobile device 900 may communicate via a network (e.g., the Internet, a WiFi network, or a cellular network).

The predicted future geographic location 922 may be transmitted or provided to the server. In response, mobile device 900 may receive from the server a content item 924. The content item 924 may correspond to one or more of an article, a restaurant review, an online encyclopedia article about a point of interest, a post from a social network by a connection of the user on the social network, etc. Prior to receiving the content item 924 on the mobile device 900, the user indicated that he/she desires to receive such notifications. When the notification arrives an alert (e.g., a tone or a vibration) may be provided by the mobile device and the notification may be presented upon an indication, by the user, that he/she is interested in the notification. For example, the user may press a button or touch or slide an indicator on the screen of the mobile device 900 to view the content item 924.

Figure 10:
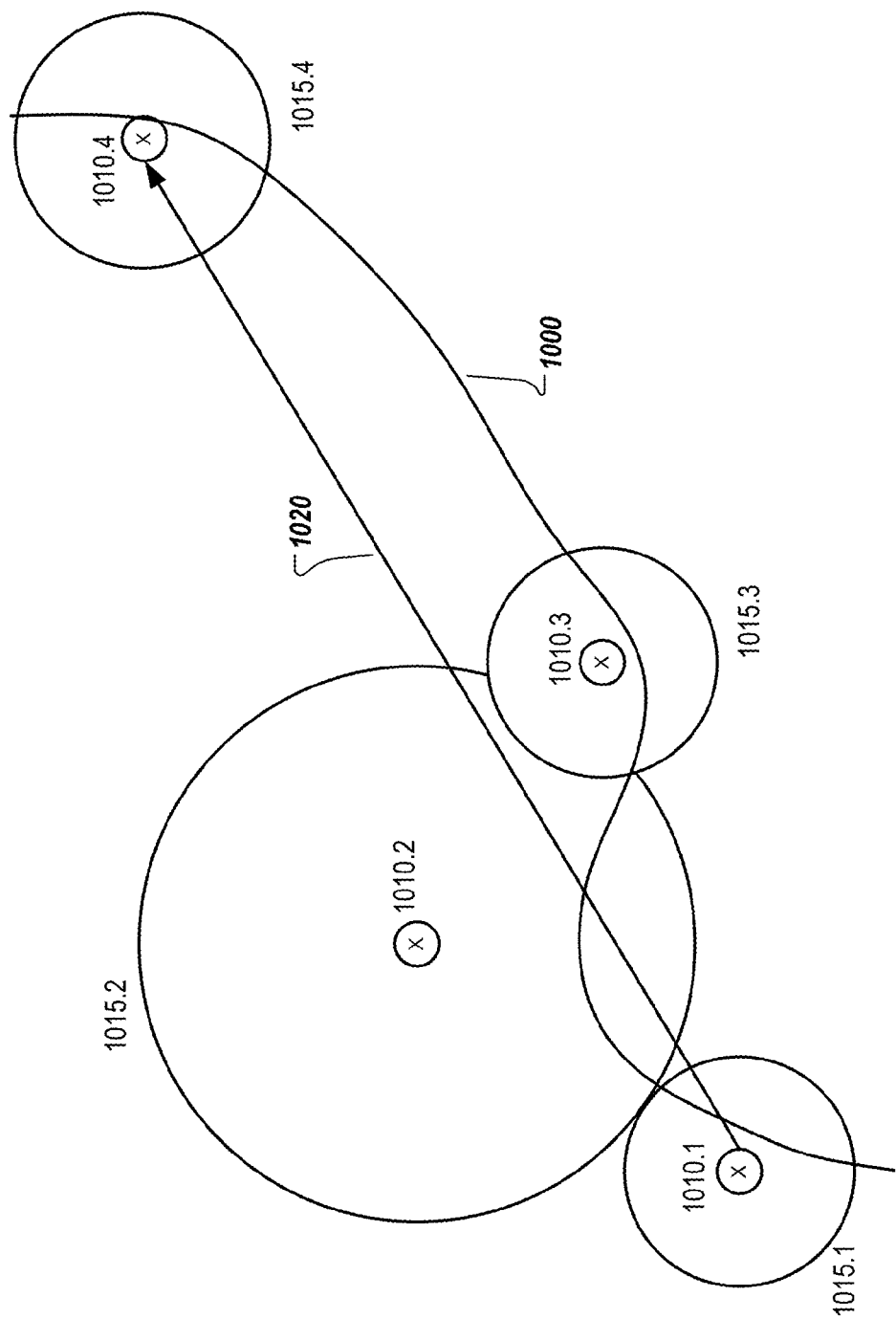
FIG. 10 illustrates an example of a motion path of a mobile device.

FIG. 10 illustrates an example of a motion path 1000 of a mobile device (e.g., mobile device 900 of FIG. 9).

While the mobile device was travelling on the motion path, the geographic location of the mobile device was determined at four positions 1010.1-4 (e.g., corresponding to geographic locations 912.1-$n$). Each position is associated with a circle 1015.1-4 representing an error radius (e.g., error radii 916.1-$n$) and a timestamp representing the current time when the mobile device was detected at the position. A motion vector 1020 is illustrated between position 1010.1 and position 1010.4. In one example implementation, position 1010.2 was not included in the motion vector 1020 because it has low accuracy, as represented by a large error radius of circle 1015.2. Position 1010.3 was not included in the motion vector 1020 because a time difference between the timestamp of position 1015.1 and the timestamp of position 1015.3 is shorter than a threshold time difference (e.g., two minutes). Predicted future positions of the mobile device may be determined based on the position 1010.4 with the latest time stamp and the motion vector 1020, for example by adding motion vector 1020 multiplied by a constant (where the product represents a displacement) to the coordinates (e.g., latitude and longitude) of position 1010.4.

Figure 11A:
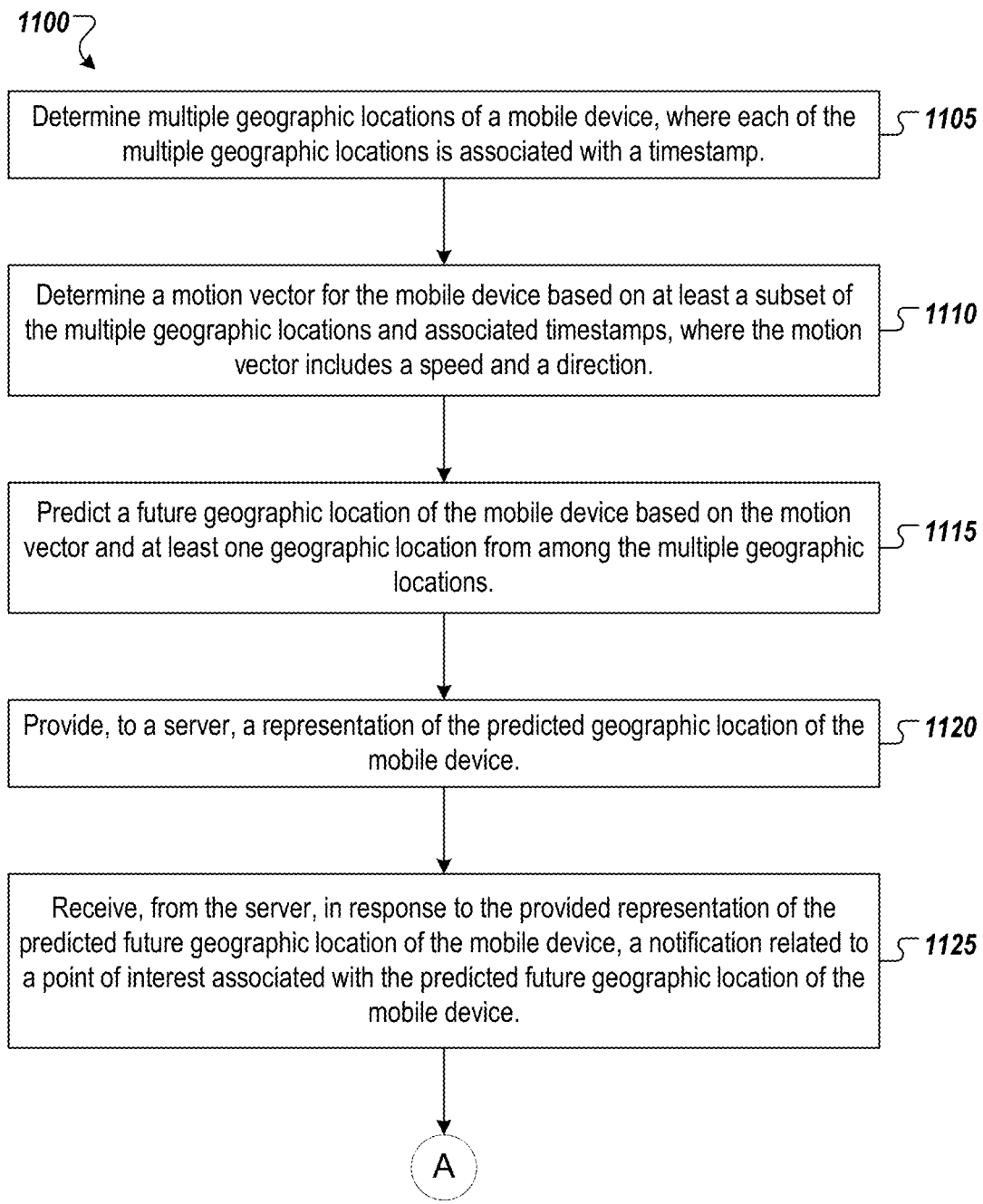
FIGS. 11A and 11B illustrate an example process by which a notification related to a future geographic location of a mobile device may be received.
Figure 11B:
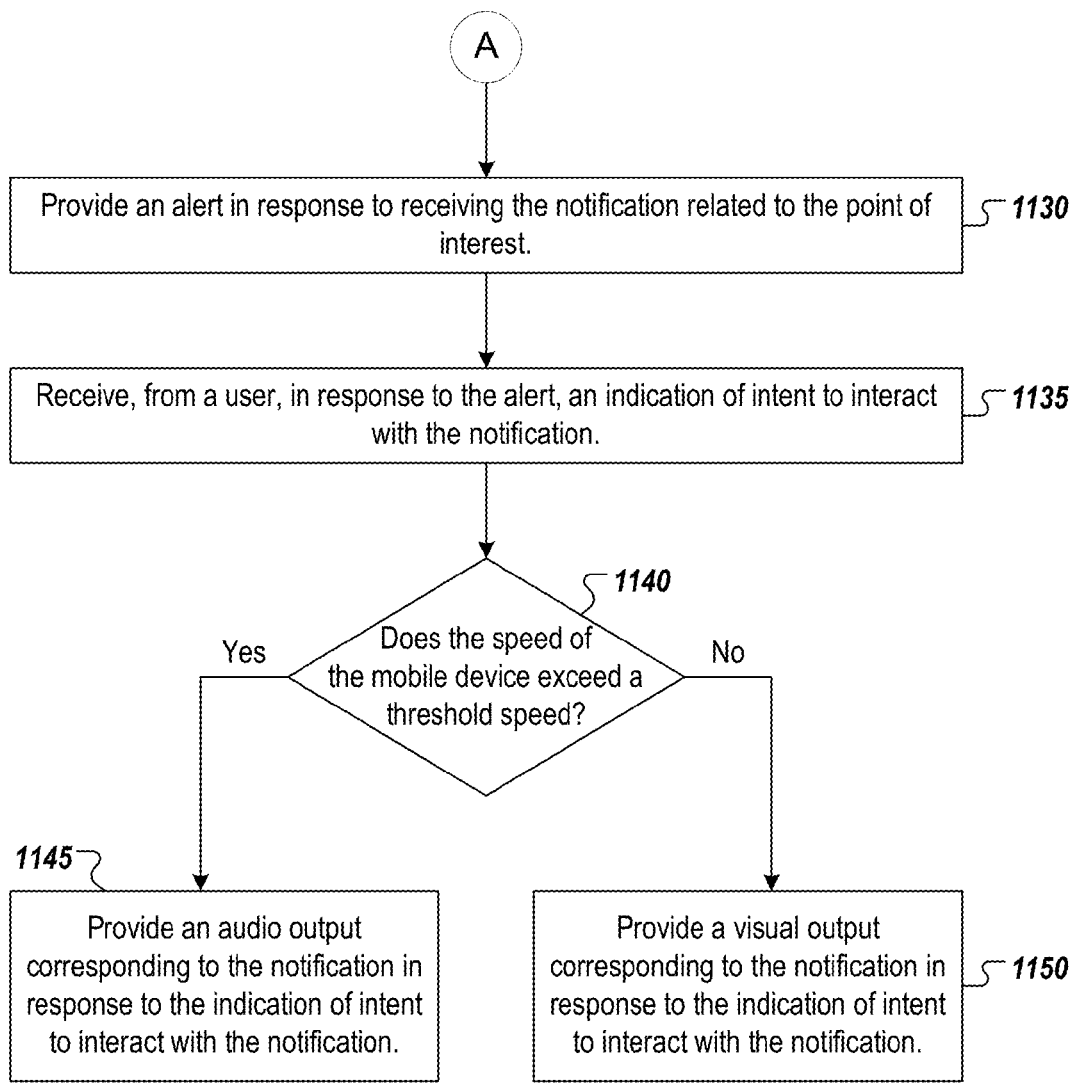

FIGS. 11A-11B illustrate an example process 1100 by which a notification related to a future geographic location of a mobile device may be received.

As illustrated in FIG. 11A, the process 1100 begins at step 1105 where the mobile device (e.g., mobile device 900) determines multiple geographic locations of the mobile device. The multiple geographic locations of the mobile device may be stored in a local memory (e.g., a cache unit) of the mobile device. Each of the multiple geographic locations is associated with a timestamp that represents a time when the mobile device was detected at the geographic location and/or an error radius. Each of the multiple geographic locations may be represented as a latitude and longitude, a street address, or any other representation of geographic location. The geographic locations may be determined based on one or more GPS signals, cellular signals, or WiFi signals. In some aspects, triangulation of three or more GPS signals, cellular signals, or WiFi signals may be used. In some aspects, the process 1100 may forego enabling or turning on the GPS receiver unless another application of the mobile phone (e.g., a mapping application, a driving directions application, a social network check-in application, etc.) enables or turns on the GPS receiver.

In step 1110, the mobile device determines a motion vector for the mobile device based on at least a subset of the multiple geographic locations and associated timestamps. The motion vector includes a speed (e.g., 50 kilometers per hour) and a direction (e.g., north). The subset may include geographic locations with error radii less than a threshold error radius (e.g., 100 meters) that were obtained within a certain time period (e.g., 3-5 minutes) before a current time. In some implementations, the subset includes a first geographic location and a second geographic location. A time difference between a timestamp associated with the first geographic location and a timestamp associated with the second geographic location exceeds a first time difference threshold (e.g., 30 seconds), and/or does not exceed a second time difference threshold (e.g., 3 minutes). In addition, the mobile device may determine that there are no detected geographic locations of the mobile device having timestamps between the time represented by the timestamp of the first geographic location and the time represented by the timestamp of the second geographic location that are incompatible with the direction of the motion vector (e.g., require a divergence of the motion vector exceeding 15 degrees). In some implementations, the motion vector is determined by applying a Kalman filter to the subset of the multiple geographic locations, the associated timestamps, and/or the associated error radii. An error vector for the motion vector may be calculated via the Kalman filter or may be determined based on the error radius for one or more of the geographic locations in the subset (e.g., the geographic location in the subset having a timestamp with the latest time).

In some aspects, if the speed of the mobile device exceeds a first threshold speed (e.g., 25 kilometers per hour), the mobile device may conclude that the user of the mobile device is driving a motor vehicle, and the mobile device may be placed into a driving mode. If the speed of the mobile device does not exceed the first threshold speed, the mobile device may conclude that the user of the mobile device is not driving a motor vehicle and the mobile device may be placed into a non-driving mode. The user interface for at least one application (e.g., a text messaging application, an email application, a newspaper application, etc.) of the mobile device may be different in a driving mode and in a non-driving mode. For example, in a driving mode the text messaging application may play incoming text messages via text-to-speech software, while in a non-driving mode the text messaging application may display incoming text messages via a screen.

In step 1115, the mobile device predicts a future geographic location of the mobile device based on the motion vector (i.e., the speed and the direction) and at least one geographic location from among the multiple geographic locations.

In step 1120, the mobile device provides (or facilitates providing), to a server via a network, a representation of the predicted geographic location of the mobile device.

In step 1125, the mobile device receives (or facilitates receiving), from the server via the network, in response to the predicted future geographic location of the mobile device, a notification related to a point of interest associated with the predicted future geographic location of the mobile device. The notification may be received while the mobile device is in either a sleep mode or an awake mode, as phone calls or text messages may be received in either mode. If the mobile device is in a sleep mode, the mobile device may be awakened by the received notification. The notification may be received at the mobile device a threshold amount of time (e.g., 2-3 seconds or 2-3 minutes) before the mobile device is likely to arrive at the point of interest to allow the user of the mobile device to learn about the point of interest as he/she is passing the point of interest or to stop and visit the point of interest, for example, by exiting a highway or finding a parking spot.

As illustrated in FIG. 11B, in step 1130, the mobile device provides an alert in response to receiving the notification related to the point of interest. The alert may be, for example, one or more of an audio tone played via a speaker of the mobile device, a vibration of the mobile device, or an image displayed via a screen of the mobile device. In some aspects, the alert may include an audio output corresponding to a name of a source of the notification. For example, if the notification includes an article from the webpage ABC-Restaurant-Reviews.com, the alert may include the spoken words "ABC restaurant reviews."

In step 1135, the mobile device receives, from a user, in response to the alert, an indication of intent to interact with the notification. For example, the user may touch a portion of a touch screen corresponding to the notification via a single tap or a double tap, unlock the screen of the mobile device (e.g., via a swipe gesture), or, if appropriate permissions for the mobile phone to record sound are provided, speak one or more words for responding to the alert. The indication of intent to interact with the notification can be a voice command.

In step 1140, the mobile device determines whether the speed of the mobile device exceeds a second threshold speed (e.g., 20 kilometers per hour). The second threshold speed may be equal to or different from the first threshold speed. If the speed of the mobile device exceeds the second threshold speed, the process 1100 continues to step 1145. If the speed of the mobile device does not exceed the second threshold speed, the process 1100 continues to step 1150.

In step 1145, if the speed of the mobile device exceed the second threshold speed, the mobile device provides an audio output corresponding to the notification in response to the indication of intent to interact with the notification. For example, if the notification includes text, the audio output may correspond to an output of a text-to-speech application being applied to all or a portion of the text of the notification. The portion of the text of the notification may be, for example, a first paragraph or a summary paragraph of the text of the notification. In some aspects, the mobile device may prevent the user from receiving an indication of an additional notification while the audio output corresponding to the current notification is being provided. After step 1145, the process 1100 ends.

In step 1150, if the speed of the mobile device does not exceed the second threshold speed, the mobile device provides a visual output corresponding to the notification in response to the indication of intent to interact with the notification. The visual output may include, for example, displaying the notification on the screen of the mobile device. After step 1150, the process 1100 ends.

In one example aspect, instructions for implementing the steps 1105-1150 in the process 1100 may be stored in a memory of a mobile device and may be implemented by the mobile device. Alternatively, instructions for carrying out one or more of the steps 1105-1150 may be stored on a server remote from the mobile device and the one or more of the steps 1105-1150 may be carried out by the server. For example, according to one implementation, the server carries out steps 1110 and 1115. The steps 1105-1150 in the process 1100 may be carried out in series. Alternatively, two or more of the steps 1105-1150 in the process 1100 may be carried out in parallel.

Although certain examples provided herein describe a user's information being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely a server). In example aspects, the user information does not include and/or share the specific identification of the user (e.g., the user's name) unless otherwise specifically provided or directed by the user.

The subject technology is described above in relation to certain notifications about points of interest (e.g., historical points of interest, artistic points of interest, restaurants, etc.) at which a mobile device is present or points of interest which the mobile device is approaching. However, the subject technology is not limited to these types of notifications and may be used in conjunction with any notification. For example, the notifications may be related to calendar events or memoranda a user created for him/herself. In some implementations, a user may be able to set up an alert for him/herself to purchase milk whenever he/she passes by a grocery store at a low rate of speed (e.g., a walking speed below ten kilometers per hour) or when he/she is driving and approaching a grocery store. In other implementations, a user passing or approaching a geographic location may be notified that he/she has an upcoming calendar event at the geographic location. Alternatively, the subject technology may be used to provide alerts related to driving points of interest (e.g., railroad crossings, school zones, road construction sites, traffic law enforcement cameras, etc.) while a user is driving a motor vehicle.

Figure 12:
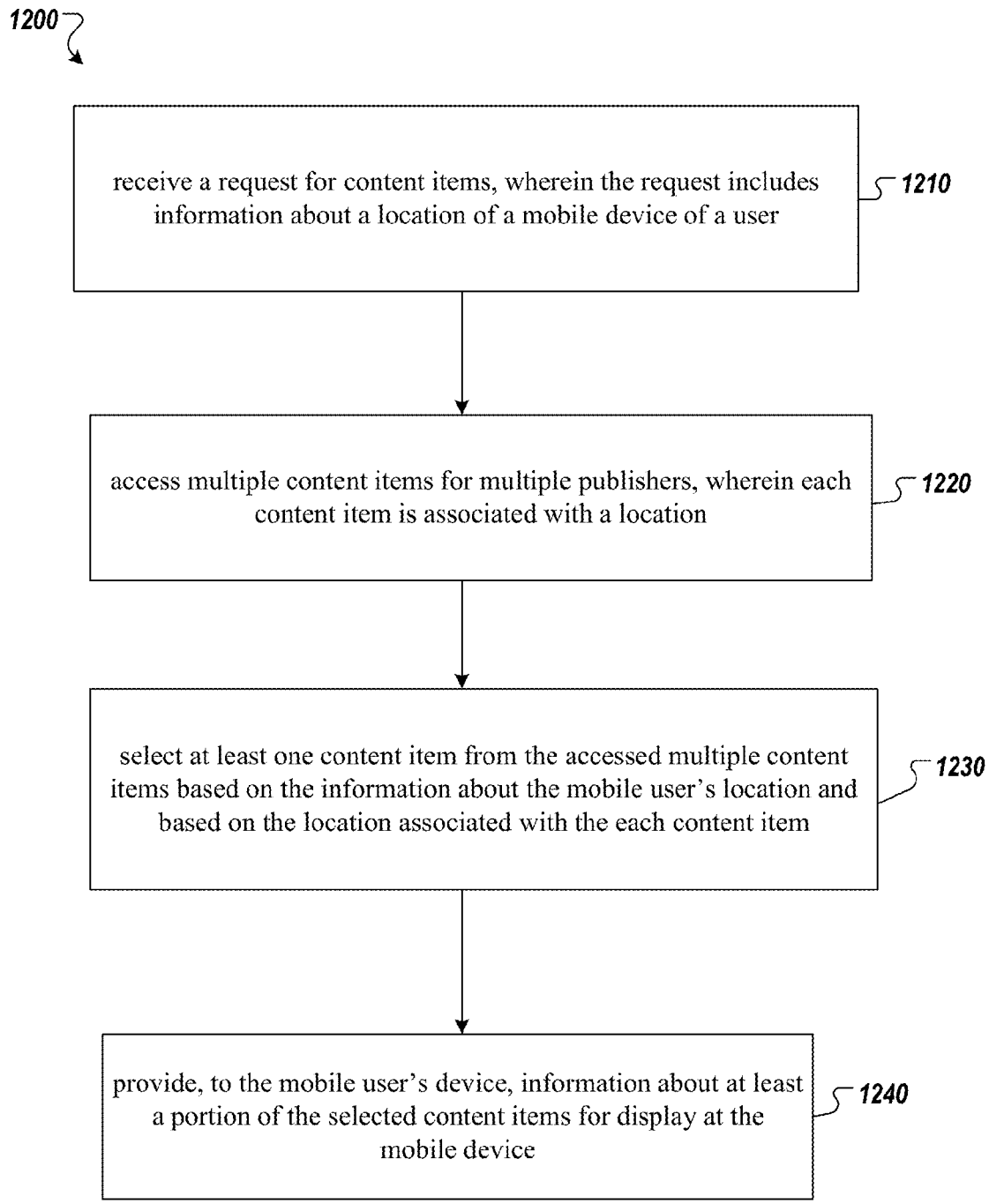
FIG. 12 is a flowchart of another example process for a location-based content publishing system.

FIG. 12 is another flowchart of an example process for location-based content system. Process 1200 starts at step 1210 upon receiving a request for content items, wherein the request includes information about a location of a mobile device of a user. The request may be received periodically (e.g., every 3 minutes) and may be issued by a module on the mobile device. The frequency of the request may change based on the mode set for receiving published content (e.g., "Feeling Lucky", "Explore", etc.), see FIG. 4A for more details.

At step 1220, multiple content items for multiple publishers, wherein each content item is associated with a location, is accessed. The content items may be accessed via a GLC system's data repository, via third party data repositories, or some combination of the two (e.g., a GLC system data repository that maintains content items for some publishers, and one or more third party data repositories that maintain content items for some other publishers). The content items are accessed in order to fulfill the request received at step 1210.

At step 1230, at least one content item from the accessed multiple content items based on the information about the mobile user's location and based on the location associated with the each content item, is selected. Content items may be selected that are within a certain polygon shaped region of the mobile user's location (e.g., as determined based on the provided information about the mobile user's location at step 1210). A location associated with each content item accessed is used to determine which content items are within a certain polygon shape of the mobile user's location. Content items may be selected that are within a certain proximity of the mobile user's location using other algorithms without deviating from the scope of this disclosure.

At step 1240, the mobile user's device is provided with information about at least a portion of the selected content items for display at the mobile device. The information may include some text, images, or any other kind of data about the selected content item or items. The provided information may then be displayed on the mobile user's device as a notification.

In some examples, a user of a mobile device may be travelling to a vacation destination. While walking or otherwise moving (e.g., via car, train, horse buggy, etc.) around the vacation spot, a GLC system may publish content about items near the user's geographic location, at the vacation spot. The published content may include historic or other interesting facts about certain points of interest (e.g., a historic building, an outdoor sculpture, a city block where an interesting event took place, etc.), or interesting places to visit that are nearby. Published content may include practical information as well, such as hotel and restaurant information.

In various aspects, the subject disclosure provides for accessing information stored about users (e.g., user location data, user web usage history, user endorsements, etc.). In such cases, a user may opt-out of having the system (e.g., a server or a data repository) store the user information or the user may need to provide affirmative permission to have the system store or access the user information as discussed for the various aspects. Information about users is not collected, stored, or used unless the user has provided permission, after being informed as to how the information is collected, stored, and used. User provided permission may be withdrawn at a later point in time. Once a user's permission is obtained, the data is used in a way that protects user privacy (e.g., location data collected is stored and handled in a way that maintains user privacy).

In various aspects, a GLC system is provided that allows publishers to provide content to be later delivered to users based on the user's geographic location. A content publisher may be any entity that provides information for a user's consumption. In some aspects, content publishers provide content associated with a location (e.g., content associated with a latitude and longitude). Content publishers may include entities such as businesses, historic societies, art organizations, educational institutions, individuals, friends, search engines, information databases, etc. For example, content publishers may include entities such as restaurant reviewers, publishers that maintain art facts or historical facts or interesting items, events content publishers, travel attractions publishers, local deals publishers, news publishers, etc.

A content publisher may provide multiple content items over periods of time. The various content published by a particular publisher is referred to herein as a publisher feed. As such, multiple publishers provide multiple publisher feeds of multiple content items from the respective publisher.

In various aspects, content provided by publishers to a GLC system includes the content and a location associated with the content. In some aspects, content provided by a publisher includes location information, such as latitude and longitude coordinates associated with the content. Content location information is then used to publish the content to users determined to be in proximity of the location associated with the content.

In some aspects, a content publisher provides location information associated with content. For example, a publisher may provide various images and associated text as content, and provide a latitude and longitude coordinate associated with that content. As another example, a publisher may provide more general location information associated with a content item, such as the city, neighborhood in the city, or address of the content item.

In various aspects, a location associated with content items provided to the GLC system is determined or calculated by the GLC system. For example, a location associated with a content item may be determined based on stored information about the content item. In some examples, location information for a historic landmark identified by name or some other attribute (e.g., "Golden Gate Bridge") may be determined as a set of latitude/longitude coordinates near the historic landmark or a more general location such as a city (e.g., "San Francisco").

In various aspects, content provided by publishers, e.g., as publisher feeds, may include content validity information. In some aspects, content validity information includes an expiration date or valid timeframe provided with the content. The expiration date or time frame may then be used to expire content after such time has elapsed or expiration date has been reached. For example, a ticket offering for a concert at a certain venue may have an expiration date set as the date of the concert. After the date of the concert, the content would not be published to subscribers as it may not be relevant to the subscribers after it has expired.

Content provided by publishers may be text, audio, video, or any other digital content that may be delivered on a computing device. Content may be of artistic value or of commercial value. For example, information about historic sites may be made available or information about restaurants, hotels, and events may be published.

Content may be provided by publishers in various formats. A GLC system may accept proprietary or standards-based formats (e.g., RSS feed, XML or other markup language based formats provided to publishers) in which to provide content to the GLC system. As an example of a proprietary format, the GLC system may support a particular comma-separated file format provided by a particular publisher. As an example of a standards-based format, an XML file structure may be provided by the GLC system to be used by publishers for providing content files or streams.

In various aspects, a GLC system is provided that allows publishers to provide content to be later delivered to users based on the user's geographic location. In some aspects, a GLC system is provided that accesses content items for various publishers to be later delivered to users based on the user's geographic location. For example, a GLC system may receive content items (e.g., that is then stored in a GLC system data repository) for later publication to mobile devices, or may access one or more third party data repositories that maintain content items from one or more publishers, or the GLC system may use some combination of the two. In either way, content items for multiple publishers that are accessible to the GLC system (e.g., either via a GLC data repository, third party data repositories, or some combination of the two) are accessed for selection and later publication to mobile devices.

In various aspects, content is published to a mobile user upon a determination that the mobile user is within a certain proximity of the content's associated location. In some aspects, content determined to be associated with a location within a certain sized polygon from a user's current location is published to the user's mobile device. In certain aspects, content associated with a location that a user will reach at a future point (e.g., based on the user's calculated travel path) is published in anticipation of the user arriving at the future point at a certain time in the future. Any algorithms may be used to determine what content is considered to be in proximity of a user's current or anticipated location to be then selected for publication to the user's device.

In various aspects, content found to be within a certain proximity of a user is published in an order based on a ranking of the content items. This will be described in greater detail below. In some aspects, a content item provided to a user is not published to the user a second time. For example, a user walking by a sculpture may be presented with information about the sculpture but the next time the user walks by the sculpture, the notification about the sculpture is not re-published to the user.

In various aspects, a list of content previously delivered to a user is maintained. In certain aspects, each content item is identified by a unique content identifier and each user is identified by a unique user identifier, and a corresponding list of content provided to a user is maintained utilizing the unique identifiers for content items and users. Using the list of content delivered to users, in some aspects, a GLC system may never show the same content twice to the same user.

In some aspects, certain points of interest may have data associated with them that changes dynamically. For example, concert events taking place at an amphitheatre or other concert venues change with time. In such cases, a GLC system may generate a new content identifier for each event, thereby notifying users multiple times about the same venue, however associated with a different event or actual content item.

In some aspects, content may be published to a user every time a user is determined to be within a certain proximity of the content. User or system configurations may guide whether or not content should be re-published to a user's device, how often content should be re-published, and after what time period has elapsed should the content be re-published. A user may opt-out of having the system (e.g., a server or a data repository) store the current and/or past geographic location(s) of his/her mobile device or the user may need to provide affirmative permission to have the system store the current and/or past geographic location(s) of his/her mobile device.

In various aspects, a mobile user subscribes to one or more publishers' feeds to receive published content. The subscribed feeds' content is published to a mobile user's device when the mobile user is determined to be in a certain proximity of the content location (e.g., within a certain proximity of the latitude and longitude associated with the content). Subscribed content found to be within the user's proximity may be selected for publishing to the user's device upon determination that the content is valid (e.g., content date or timeframe has not expired). Users may subscribe to feeds and may unsubscribe to feeds.

As set forth above, in some cases, a driver of a motor vehicle may be interested learning about points of interest that he/she is approaching using his/her mobile device. The mobile device may be configured to display information (e.g., text) via a screen. The mobile device may be configured to determine its current geographic location, but may not be configured to predict its future location or to provide information related to points of interest that the mobile device is approaching. In addition, the driver may not be able to read information displayed on a screen of the mobile device, as such reading may distract the driver from the operation of the motor vehicle. As the foregoing illustrates, a new approach for predicting a future geographic location of a mobile device and providing a notification related to the future geographic location may be desirable.

In some aspects, a set of publisher feeds may be subscribed to on behalf of a user by the GLC system. However, the user may need to affirmatively opt-in to or have the ability to opt-out of having feeds subscribed to on his/her behalf. In some aspects, users of the GLC system are subscribed to most feeds available to the GLC system as a default. The user can select to unsubscribe to system subscribed feeds. System subscribed feeds may be based on determining user interest categories (e.g., based on past web usage patterns, networking groups of the user, etc.). For example, if a user is determined to have interest in art, then art feeds may be subscribed to on the user's behalf, or recommendations to those feeds may be made to the user. System subscribed feeds may be based on determining a user's location (e.g., based on the address of a user) or based on a destination that a user is going to visit. For example, if a user lives in New York City, feeds about interesting content in New York may be system subscribed for the user or recommendations may be made to the user to subscribe to such feeds.

A GLC system may make recommendations of publisher feeds to which a user may be interested in subscribing. Recommendations may be based on web usage history of the mobile user or by analyzing other authorized and accessible information about the user. Recommendations may be based on a user's current or historical location information (e.g., where a user spends most of his/her time, where he/she lives, works etc.), or places that a user has shown interest in (e.g., a user's past search for a place in a mapping application).

Recommendations may also be based on a user's likes/dislikes as indicated by the user's feedback as provided in a GLC system (e.g., user endorsements or negative endorsements as discussed in reference to FIG. 1), or aggregate feedback from all or multiple users of the GLC system. Users may indicate likes/dislikes by providing a thumbs up/down to a piece of content. In some aspects, a user's subscription to a certain feed provides an indication that she is interested in the subscribed feed, and other feeds with similar content may be of interest to the user and therefore recommended. Data from a GLC system, as well as other products (e.g., search engines, social platforms, map applications, etc.) may be used to build a personalized model of interests for each user. Recommendations may be based on the likes/dislikes of a user's networking group (e.g., friends, family, professional group, hobby group, etc.) on social networking platforms.

In some aspects, recommendations for particular feeds are made as a user is in the proximity of a particular content item provided by a publisher. For example, as a user walks in a certain neighborhood or city, a notification about a feed that has content items related to that neighborhood or city may be provided to the mobile device of the user for user subscription to that feed. Recommendations may be sent to users as notifications on their respective mobile device or may be emailed to the user's email address.

In various aspects, selected content (e.g., based on proximity of a mobile user's location and content location information) is published to the user's mobile device as notifications. For example, a pop-up window containing content, publisher information and an action item may be presented to the user, as will be described in greater detail with reference to FIG. 1. The notification may be provided on a locked or un-locked user screen.

A GLC system may take into account several factors before publishing or displaying content items as notifications. For example, notifications may be disabled after a certain time at night. In some aspects, if a user has a meeting scheduled (e.g., determined by authorized access to a user's calendar application), notifications may be delayed or paused during the meeting time interval.

In some aspects, statistics may be maintained by a GLC system about content items provided by publishers. Such statistics may later be provided to publishers upon authorized request. For example, the number of times a content item was published may be maintained. As another example, numbers on negative/positive endorsements received about the content items published may be maintained. Statistics may be maintained on the demographics of users who provided negative endorsements and users who provided positive endorsements about published content items. The numbers then may be communicated to publishers upon request.

A GLC system has the advantage of allowing mobile users to discover interesting information about point(s) of interest near the users. The GLC system allows discovery of information by providing content that is not based on an explicit user request, rather that is based on the geographic location of a user and associated content location. The GLC system may have an additional advantage of providing content and information when a user is closer to a desired content item. Another advantage of the GLC system is that users do not necessarily need to go to multiple websites to get content. Instead, they can subscribe to content published by various publishers and get the integrated content in one platform, the GLC platform.

In some aspects, fees may be associated with publishers providing content to the GLC system. In some aspects, fees may be associated with subscribers subscribing to certain feeds. For example, a fee may be associated with a feed that provides deals, offers, coupons, etc. as part of the content. In other cases, content feeds may require a subscription fee for subscribing users (e.g., a paid premium content feed). In certain aspects, content feeds may be free, without any associated fee.

The subject technology is related to receiving, on a mobile device, a notification (e.g., an article) related to a predicted future geographic location of a mobile device. According to some implementations, the mobile device determines multiple geographic locations of the mobile device, each of which is associated with a timestamp representing a time when the mobile device was at the geographic location. The mobile device determines a motion vector for the mobile device based on at least a subset of the multiple geographic locations and associated timestamps. The motion vector includes a speed and a direction. The mobile device predicts one or more future geographic locations of the mobile device based on the motion vector and at least one geographic location from among the multiple geographic locations. The mobile device provides, to a server via a network, a representation of the predicted future geographic location of the mobile device. The mobile device receives, from the server via the network, in response to the provided representation of the predicated future geographic location of the mobile device, a notification related to a point of interest associated with the predicted future geographic location of the mobile device.

According to some implementations, the mobile device provides an alert (e.g., an audio tone, a vibration, or a displayed image) in response to receiving the notification. The mobile device receives, from the user, in response to the alert, an indication of intent to interact with the notification (e.g., a button press, a touch of a touch screen, or a sliding gesture on the touch screen). If the speed of the mobile device exceeds a threshold speed (e.g., 25 kilometers per hour) the mobile device provides an audio output corresponding to the notification, as the user of the mobile device is likely driving, in response to the indication of intent to interact with the notification. If the speed of the mobile device does not exceed the threshold speed, the mobile device provides a visual output corresponding the notification, as the user of the mobile device is not likely driving, in response to the indication of intent to interact with the notification.

Figure 13:
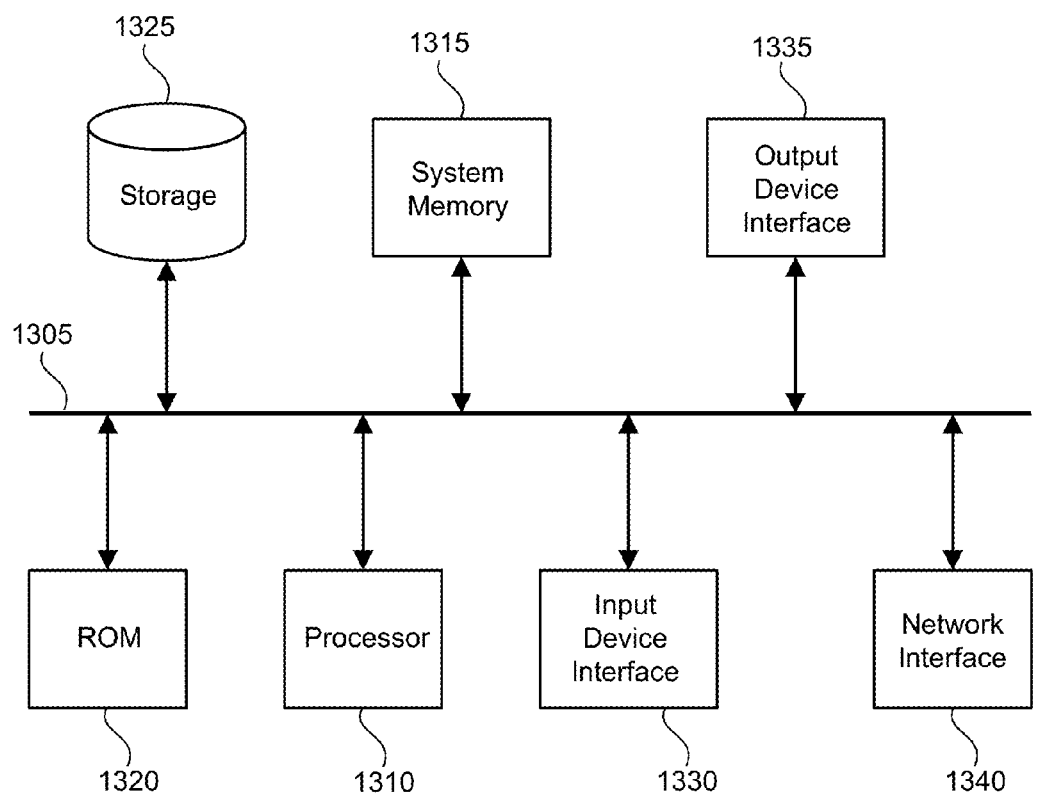
FIG. 13 conceptually illustrates an example electronic system with which some implementations of the subject technology can be implemented.

FIG. 13 conceptually illustrates an electronic system 1300 with which some implementations of the subject technology are implemented. For example, one or more of the data repository 510, the server 520, the mobile device 530, the computing device 540, or the mobile device 900 may be implemented using the arrangement of the electronic system 1300. The electronic system 1300 can be a computer (e.g., a mobile phone, PDA), or any other sort of electronic device. Such an electronic system includes various types of computer readable media and interfaces for various other types of computer readable media. Electronic system 1300 includes a bus 1305, processing unit(s) 1310, a system memory 1315, a read-only memory 1320, a permanent storage device 1325, an input device interface 1330, an output device interface 1335, and a network interface 1340.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1320, the system memory 1315, and the permanent storage device 1325.

From these various memory units, the processing unit(s) 1310 retrieves instructions to execute and data to process in order to execute the processes of the subject technology. The processing unit(s) can be a single processor or a multi-core processor in different implementations.

The read-only-memory (ROM) 1320 stores static data and instructions that are needed by the processing unit(s) 1310 and other modules of the electronic system. The permanent storage device 1325, on the other hand, is a read-and-write memory device. This device is a non-volatile memory unit that stores instructions and data even when the electronic system 1300 is off. Some implementations of the subject technology use a mass-storage device (for example a magnetic or optical disk and its corresponding disk drive) as the permanent storage device 1325.

Other implementations use a removable storage device (for example a floppy disk, flash drive, and its corresponding disk drive) as the permanent storage device 1325. Like the permanent storage device 1325, the system memory 1315 is a read-and-write memory device. However, unlike storage device 1325, the system memory 1315 is a volatile read-and-write memory, such a random access memory. The system memory 1315 stores some of the instructions and data that the processor needs at runtime. In some implementations, the processes of the subject technology are stored in the system memory 1315, the permanent storage device 1325, or the read-only memory 1320. For example, the various memory units include instructions for providing a notification related to a future geographic location of a mobile device in accordance with some implementations. From these various memory units, the processing unit(s) 1310 retrieves instructions to execute and data to process in order to execute the processes of some implementations.

The bus 1305 also connects to the input and output device interfaces 1330 and 1335. The input device interface 1330 enables the user to communicate information and select commands to the electronic system. Input devices used with input device interface 1330 include, for example, alphanumeric keyboards and pointing devices (also called "cursor control devices"). Output device interfaces 1335 enables, for example, the display of images generated by the electronic system 1300. Output devices used with output device interface 1335 include, for example, printers and display devices, for example cathode ray tubes (CRT) or liquid crystal displays (LCD). Some implementations include devices for example a touchscreen that functions as both input and output devices.

Finally, as shown in FIG. 13, bus 1305 also couples electronic system 1300 to a network (not shown) through a network interface 1340. In this manner, the electronic system 1300 can be a part of a network of computers (for example a local area network ("LAN"), a wide area network ("WAN"), or an Intranet, or a network of networks, for example the Internet. Any or all components of electronic system 1300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for receiving a notification related to a predicted future geographic location of a mobile device, the method comprising:
   subscribing, by one or more computing devices, to a publisher feed, the publisher feed being associated with one or more content items, each content item being associated with a point of interest;
   determining, by the one or more computing devices, a plurality of geographic locations of the mobile device, wherein each of the plurality of geographic locations is associated with a timestamp;
   determining, by the one or more computing devices, a speed of the mobile device based on at least a subset of the plurality of geographic locations and associated timestamps;
   predicting, by the one or more computing devices, a future geographic location of the mobile device based on the speed and at least one geographic location from among the plurality of geographic locations;
   providing, by the one or more computing devices, to a server, a representation of the predicted future geographic location of the mobile device;
   when at least one content item from the publisher feed is associated with a point of interest that is located within a threshold distance of the predicted future geographic location, receiving, by the one or more computing devices, from the server, a notification related to the at least one content item;
   when the speed of the mobile device exceeds a threshold speed, providing, by the one or more computing devices, an audio output corresponding to the notification; and
   when the speed of the mobile device does not exceed the threshold speed, providing, by the one or more computing devices, a visual output corresponding to the notification.

2. The method of claim 1, further comprising:
   providing, by the one or more computing devices, an alert in response to receiving the notification related to the at least one content item;
   receiving, by the one or more computing devices, from the user, in response to the alert, an indication of intent to interact with the notification, wherein the audio output or the visual output is provided in response to the indication of intent to interact with the notification.

3. The method of claim 2, wherein the alert comprises one or more of an audio tone, a vibration of the mobile device, or a displayed image.

4. The method of claim 1, further comprising:
   when the speed of the mobile device exceeds a threshold speed, placing, by the one or more computing devices, the mobile device into a driving mode; and
   when the speed of the mobile device does not exceed the threshold speed, placing, by the one or more computing devices, the mobile device into a non-driving mode, wherein the user interface for at least one application of the mobile device is different in a driving mode and in a non-driving mode.

5. The method of claim 1, wherein receiving the notification related to the at least one content item comprises:
   receiving, while the mobile device is in a sleep mode, the notification related to the at least one content item.

6. The method of claim 1, wherein each of the plurality of geographic locations is associated with an error radius, and wherein the at least the subset of the plurality of geographic locations comprises geographic locations with error radii less than a threshold error radius.

7. The method of claim 1, wherein the at least the subset of the plurality of geographic location comprises a first geographic location and a second geographic location, and wherein a time difference between a timestamp associated with the first geographic location and a timestamp associated with the second geographic location exceeds a time difference threshold.

8. The method of claim 1, wherein determining the speed of the mobile device comprises:
   determining, by the one or more computing devices, a motion vector for the mobile device based on the at least the subset of the plurality of geographic locations and the associated timestamps, wherein the motion vector comprises the speed and a direction.

9. The method of claim 8, wherein determining the motion vector for the mobile device based on the at least the subset of the plurality of geographic locations and the associated timestamps comprises:
   determining, by the one or more computing devices, the motion vector for the mobile device by applying a Kalman filter to the at least the subset of the plurality of geographic locations and the associated timestamps.

10. A non-transitory computer-readable medium comprising instructions that, when executed by a computer, cause the computer to perform a method for receiving a notification related to a predicted future geographic location of a mobile device, the method comprising:
    subscribing to a publisher feed, the publisher feed being associated with one or more content items, each content item being associated with a point of interest
    determining a plurality of geographic locations of the mobile device, wherein each of the plurality of geographic locations is associated with a timestamp;
    determining a motion vector of the mobile device based on at least a subset of the plurality of geographic locations and associated timestamps, wherein the motion vector comprises a speed of the mobile device and a direction of the mobile device;
    predicting a future geographic location of the mobile device based on the motion vector and at least one geographic location from among the plurality of geographic locations;
    providing, to a server, a representation of the predicted future geographic location of the mobile device when at least one content item from the publisher feed is associated with a point of interest that is located within a threshold distance of the predicted future geographic location, receiving, from the server, a notification related to the at least one content item;

when the speed of the mobile device exceeds a threshold speed, providing an audio output corresponding to the notification; and when the speed of the mobile device does not exceed the threshold speed, providing a visual output corresponding to the notification.

11. The non-transitory computer-readable medium of claim 10, wherein the method further comprises: providing an alert in response to receiving the notification related to the at least one content item;

receiving, from the user, in response to the alert, an indication of intent to interact with the notification, wherein the audio output or the visual output is provided in response to the indication of intent to interact with the notification.

12. The non-transitory computer-readable medium of claim 11, wherein the alert comprises one or more of an audio tone, a vibration of the mobile device, or a displayed image.

13. The non-transitory computer-readable medium of claim 10, wherein the method further comprises: when the speed of the mobile device exceeds a threshold speed, placing the mobile device into a driving mode; and when the speed of the mobile device does not exceed the threshold speed, placing the mobile device into a non-driving mode, wherein the user interface for at least one application of the mobile device is different in a driving mode and in a non-driving mode.

14. The non-transitory computer-readable medium of claim 10, wherein the method further comprises: receiving, while the mobile device is in a sleep mode, the notification related to the at least one content item.

15. The non-transitory computer-readable medium of claim 10, wherein each of the plurality of geographic locations is associated with an error radius, and wherein the at least the subset of the plurality of geographic locations comprises geographic locations with error radii less than a threshold error radius.

16. The non-transitory computer-readable medium of claim 10, wherein the at least the subset of the plurality of geographic location comprises a first geographic location and a second geographic location, and wherein a time difference between a timestamp associated with the first geographic location and a timestamp associated with the second geographic location exceeds a time difference threshold.

17. The non-transitory computer-readable medium of claim 10, wherein determining the speed of the mobile device comprises: determining a motion vector for the mobile device based on the at least the subset of the plurality of geographic locations and the associated timestamps, wherein the motion vector comprises the speed and a direction.

18. The non-transitory computer-readable medium of claim 17, wherein determining the motion vector for the mobile device based on the at least the subset of the plurality of geographic locations and the associated timestamps comprises: determining the motion vector for the mobile device by applying a Kalman filter to the at least the subset of the plurality of geographic locations and the associated timestamps.

19. A system for receiving a notification related to a predicted future geographic location of a mobile device, the system comprising:

one or more processors; and a memory comprising instructions which, when executed by the one or more processors, cause the one or more processors to implement a method, the method comprising:

subscribing to a publisher feed, the publisher feed being associated with one or more content items, each content item being associated with a point of interest;

determining a plurality of geographic locations of the mobile device, wherein each of the plurality of geographic locations is associated with a timestamp;

determining a speed of the mobile device based on at least a subset of the plurality of geographic locations and associated timestamps;

predicting a future geographic location of the mobile device based on the speed and at least one geographic location from among the plurality of geographic locations;

providing, to a server, a representation of the predicted future geographic location of the mobile device;

when at least one content item from the publisher feed is associated with a point of interest that is located within a threshold distance of the predicted future geographic location, receiving, from the server, a notification related to the at least one content item;

providing an alert in response to receiving the notification related to the at least one content item;

receiving, from the user, in response to the alert, an indication of intent to interact with the notification;

when the speed of the mobile device exceeds a threshold speed, providing an audio output corresponding to the notification in response to the indication of intent to interact with the notification; and when the speed of the mobile device does not exceed the threshold speed, providing a visual output corresponding to the notification in response to the indication of intent to interact with the notification.

20. The system of claim 19, wherein the alert comprises one or more of an audio tone, a vibration of the mobile device, or a displayed image.

* * * * *